US010622719B2

(12) United States Patent
Kim et al.

(10) Patent No.: US 10,622,719 B2
(45) Date of Patent: Apr. 14, 2020

(54) ANTENNA DEVICE AND PORTABLE TERMINAL COMPRISING SAME

(71) Applicant: SKC CO., LTD., Suwon-si, Gyeonggi-do (KR)

(72) Inventors: Tae Kyoung Kim, Seoul (KR); Jong Hwi Park, Suwon-si (KR); Jin Cheol Kim, Hwaseong-si (KR); Hyun Gon Moon, Suwon-si (KR); Jonghak Choi, Uiwang-si (KR); Nah Young Kim, Anseong-si (KR)

(73) Assignee: SKC CO., LTD., Suwon-si (KR)

( * ) Notice: Subject to any disclaimer, the term of this patent is extended or adjusted under 35 U.S.C. 154(b) by 249 days.

(21) Appl. No.: 15/609,082

(22) Filed: May 31, 2017

(65) Prior Publication Data

US 2017/0346165 A1 Nov. 30, 2017

(30) Foreign Application Priority Data

May 31, 2016 (KR) .......................... 10-2016-0067239
Sep. 23, 2016 (KR) .......................... 10-2016-0122342
Sep. 23, 2016 (KR) .......................... 10-2016-0122440

(51) Int. Cl.
*H01Q 1/24* (2006.01)
*H01Q 7/06* (2006.01)
(Continued)

(52) U.S. Cl.
CPC .............. *H01Q 7/06* (2013.01); *H01Q 1/243* (2013.01); *H01Q 1/36* (2013.01); *H01Q 7/08* (2013.01);
(Continued)

(58) Field of Classification Search
CPC ............ H01Q 7/06; H01Q 1/243; H01Q 1/36; H01Q 7/08; H04B 5/0081
See application file for complete search history.

(56) References Cited

U.S. PATENT DOCUMENTS 10,033,104 B2  7/2018  Nakano et al.
2007/0001921 A1*  1/2007  Takahashi ............... H01Q 1/38
                                                        343/788
(Continued)

FOREIGN PATENT DOCUMENTS

CN   101542832 A   9/2009
JP   2003032023 A   1/2003
(Continued)

OTHER PUBLICATIONS

Korean Intellectual Property Office, Communication dated May 4, 2018, issued in counterpart Korean Application No. 10-2017-0067493.
(Continued)

*Primary Examiner* — Ab Salam Alkassim, Jr.
(74) *Attorney, Agent, or Firm* — Sughrue Mion, PLLC

(57) ABSTRACT

An antenna device in which a conductive foil or an antenna pattern directly formed on the magnetic sheet without an insulating substrate such as polyimide, has a reduced thickness and may be prepared simple process. Also, with respect to the antenna device, flexibility may be improved by using a polymer-type magnetic sheet, and, since magnetic properties are excellent, the antenna device may be used for multiple applications such as NFC, WPC, and MST.

18 Claims, 10 Drawing Sheets

(51) Int. Cl.
  *H01Q 1/36* (2006.01)
  *H01Q 7/08* (2006.01)
  *H01F 1/147* (2006.01)
  *H04B 5/00* (2006.01)

(52) U.S. Cl.
  CPC ........ *H01F 1/14775* (2013.01); *H04B 5/0081* (2013.01)

(56) References Cited

U.S. PATENT DOCUMENTS

| | | | |
|---|---|---|---|
| 2007/0095913 A1* | 5/2007 | Takahashi | G06K 7/10336 235/451 |
| 2009/0128437 A1 | 5/2009 | Sonoda et al. | |
| 2010/0001226 A1* | 1/2010 | Aramaki | B22F 3/22 252/62.55 |
| 2010/0264357 A1* | 10/2010 | Aramaki | C08K 3/32 252/62.54 |
| 2012/0091210 A1* | 4/2012 | Koujima | G06K 19/07749 235/492 |
| 2012/0249276 A1* | 10/2012 | Fontana | H01F 17/0013 336/105 |
| 2014/0035793 A1 | 2/2014 | Kato et al. | |
| 2014/0176286 A1* | 6/2014 | Okada | H01B 3/12 336/200 |
| 2015/0123604 A1* | 5/2015 | Lee | H01F 38/14 320/108 |
| 2015/0124402 A1* | 5/2015 | Jang | B32B 27/08 361/679.55 |
| 2015/0279554 A1* | 10/2015 | Ryoson | H01Q 7/06 343/788 |
| 2015/0342099 A1* | 11/2015 | Jang | H01F 1/16 174/350 |
| 2016/0064814 A1* | 3/2016 | Jang | H01Q 1/526 343/842 |
| 2016/0113113 A1* | 4/2016 | Sethumadhavan | D06M 11/83 174/268 |
| 2016/0261026 A1 | 9/2016 | Han et al. | |
| 2016/0307697 A1* | 10/2016 | Mio | H01F 41/0266 |
| 2017/0084982 A1* | 3/2017 | Fang | H04B 5/0056 |
| 2017/0341341 A1* | 11/2017 | Kim | B32B 5/16 |
| 2017/0345535 A1* | 11/2017 | Kim | H01F 1/26 |
| 2018/0254140 A1* | 9/2018 | Lee | H02J 50/12 |

FOREIGN PATENT DOCUMENTS

| | | |
|---|---|---|
| JP | 2008236416 A | 10/2008 |
| JP | 2014075775 A | 4/2014 |
| JP | 5780298 B2 | 9/2015 |
| KR | 10-2015-0010063 A | 1/2015 |
| KR | 10-2015-0015204 A | 2/2015 |
| KR | 10-1594380 B1 | 2/2016 |
| WO | 2015175674 A1 | 11/2015 |

OTHER PUBLICATIONS

Taiwanese Intellectual Property Office; Communication dated Jul. 13, 2018 in counterpart TW application No. 106117923.

Japanese Patent Office: Communication dated Sep. 25, 2018 in counterpart application No. 2017-107096.

* cited by examiner

ANTENNA DEVICE AND PORTABLE TERMINAL COMPRISING SAME

TECHNICAL FIELD

The embodiments relate to an antenna device which may be used in the fields such as near field communication, wireless power charging, and magnetic secure transmission, and a portable terminal comprising same.

BACKGROUND ART

Recently, an antenna for realizing functions, such as near field communication (NFC), wireless power charging (WPC), and magnetic secure transmission (MST), is being installed in mobile devices such as a mobile phone, a tablet PC, and a notebook PC. However, other metallic parts are present in such mobile devices and an eddy current occurs when an alternating magnetic field formed in the device is applied to such metallic parts, which results in degradation in performance of the antenna and reduction in a recognition distance.

Conventionally, in order to solve the above problems, an antenna device with multiple uses was prepared by attaching a high permeability ferrite sheet to one side of a typical circuit board (antenna), such as a polyimide substrate, having an antenna pattern layer formed on the other side thereof. This uses a principle that a magnetic body, such as the ferrite sheet, focuses the magnetic flux of the antenna so that the penetration of a magnetic field into a metal surface and the generation of the eddy current may be prevented and operating characteristics may be improved.

DISCLOSURE OF THE INVENTION

Technical Problem

However, in this case, i.e., when the circuit board to which a magnetic sheet is bonded is installed as an antenna device in a mobile device, efficiency of internal space, which is inevitably limited by the mounting of various parts, of the mobile device becomes reduced. Also, owing to weak adhesiveness between the circuit board and the magnetic sheet, delamination may occur, and, in case of using an adhesive layer in order to prevent the delamination, a total thickness of the antenna device undesirably increases.

Thus, there is a need to develop a new and thin antenna device which has a magnetic property which may be used for multiple applications such as NFC, WPC, and MST, and may be prepared by a simple process.

With respect to a typical antenna device, an electromagnetic signal, which may be transmitted to and received from an external terminal, is generated by forming a coil-shaped antenna pattern on one side of an insulating substrate layer and forming a circuit by respectively connecting one end and the other end of the antenna pattern to terminal patterns for input and output. However, when the antenna pattern and the terminal pattern are allowed to be disposed on the same plane, since the antenna pattern generally has a coil shape, it may be impossible to directly connect either the one end or the other end to the terminal pattern. Accordingly, the antenna pattern and the terminal pattern may be connected through a separate wiring, but, in this case, there is a need to prevent the occurrence of a short circuit between the wiring and the antenna pattern. However, in case an insulating process, for example, covering the wiring by separate taping, is further performed for this purpose, process efficiency may be reduced and it is difficult to prepare a thin device.

Furthermore, a typical antenna device generates an electromagnetic signal, which may be transmitted to and received from an external terminal, by forming a coil-shaped antenna pattern on one side of an insulating substrate layer. However, as illustrated in FIG. 16, with respect to such antenna device 20', since the transmission of the electromagnetic signal 50' to an external terminal 40' is blocked by an electromagnetic wave shielding material such as a metal case 30', it is difficult to apply the typical antenna device 20' to a portable terminal having a metal case. Also, in order to solve the above limitation, there have been attempts to provide an electromagnetic wave transmission region with, but an area of the electromagnetic wave transmission region should be significantly increased to enable effective signal transmission and reception in consideration of electromagnetic signal transmission characteristics of the typical antenna device.

Thus, an object of the embodiments is to provide a thin antenna device, in which transmission and reception is possible in various cases, while having a magnetic property which may be used for multiple applications such as NFC, WPC, and MST, which is capable of being prepared by a simple process. Also, another object of the embodiments is to provide a portable terminal comprising the antenna device.

Solution to Problem

According to an embodiment, there is provided an antenna device comprising a magnetic sheet; an antenna pattern disposed on one side or both sides of the magnetic sheet; and at least one via penetrating through the magnetic sheet and connected to the antenna pattern.

In the embodiment, the antenna pattern may comprise a first antenna pattern disposed on the one side of the magnetic sheet, the antenna device may further comprise a wiring pattern disposed on the other side of the magnetic sheet, and the via may comprise a first via penetrating through the magnetic sheet and connected to one end of the first antenna pattern and one end of the wiring pattern.

Also, in the embodiment, the antenna pattern may be composed of a plurality of first conductive line patterns disposed in parallel to be spaced apart from one another on the one side of the magnetic sheet; and a plurality of second conductive line patterns disposed in parallel to be spaced apart from one another on the other side of the magnetic sheet, wherein elongating directions of the first conductive line patterns and the second conductive line patterns are same, and the via may be composed of a plurality of vias which penetrate through the magnetic sheet and connect the first conductive line patterns and the second conductive line patterns.

According to another embodiment, there is provided a portable terminal comprising a case and an antenna device disposed in the case, wherein the case comprises an electromagnetic wave transmission region and an electromagnetic wave non-transmission region, the antenna device comprises a magnetic sheet; a plurality of first conductive line patterns disposed in parallel to be spaced apart from one another on the one side of the magnetic sheet; a plurality of second conductive line patterns disposed in parallel to be spaced apart from one another on the other side of the magnetic sheet; and a plurality of vias which penetrate through the magnetic sheet, elongating directions of the first conductive line patterns and the second conductive line patterns are same, and the electromagnetic wave transmission region is disposed in parallel with the first conductive line patterns and the second conductive line patterns.

Advantageous Effects of the Invention

With respect to the antenna device according to the embodiments, a thickness may be reduced and a preparation process may be simplified by directly forming a conductive foil or an antenna pattern on the magnetic sheet without an insulating substrate such as polyimide. Also, the antenna device according to the embodiments may have excellent flexibility by using a polymer-type magnetic sheet, and, it may have an excellent magnetic property and be used for multiple applications such as NFC, WPC, and MST.

According to a specific embodiment, since an additional process, such as taping of wiring, is not required to prevent a short circuit of the single-sided antenna device by respectively disposing an antenna pattern and a wiring pattern on different sides of the magnetic sheet and connecting these patterns through a via penetrating through the magnetic sheet, process efficiency may be increased. Also, since the antenna device according to the embodiments may prevent an increase in thickness according to the covering of the wiring for insulation, thin-film characteristics of the antenna device may be further improved.

According to another specific embodiment, since the antenna device comprises first conductive line patterns and second conductive line patterns respectively disposed on the different sides of the magnetic sheet and both ends of these patterns are alternately connected through vias, a coil surrounding a core region of the magnetic sheet may be formed. Accordingly, since an electromagnetic signal may be effectively transmitted and received through the end of the core region of the magnetic sheet, the antenna device may have improved communication sensitivity.

Furthermore, the portable terminal according to the embodiments may transmit and receive the electromagnetic signal in a narrow gap of the case by using the antenna device. Thus, even in case of using formed of an electromagnetic signal blocking material, such as a metal, the portable terminal may effectively transmit and receive the electromagnetic signal with an external terminal through a narrow electromagnetic wave transmission region.

DETAILED DESCRIPTION OF THE INVENTION

Figure 1:
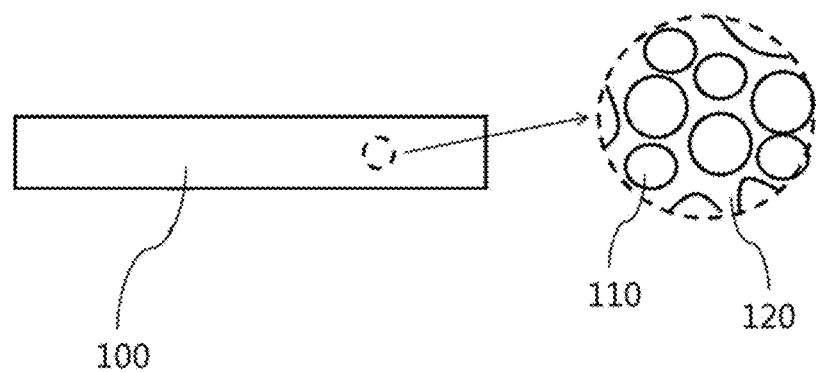
FIG. 1 illustrates a cross-sectional view of a magnetic sheet according to an embodiment.

According to an embodiment, there is provided an antenna device comprising a magnetic sheet; an antenna pattern disposed on one side or both sides of the magnetic sheet; and at least one via penetrating through the magnetic sheet and connected to the antenna pattern.

In this embodiment, the magnetic sheet may be an unsintered cured sheet with a thickness of 10 μm to 3,000 μm having flexibility, and the magnetic sheet may comprise a binder resin and a magnetic powder dispersed in the binder resin.

Further, the magnetic sheet may have a magnetic permeability of 100 to 300 based on an alternating current with a frequency of 3 MHz, a magnetic permeability of 80 to 270 based on an alternating current with a frequency of 6.78 MHz, and a magnetic permeability of 60 to 250 based on an alternating current with a frequency of 13.56 MHz.

In a specific embodiment, the antenna pattern may comprise a first antenna pattern disposed on the one side of the magnetic sheet, the antenna device may further comprise a wiring pattern disposed on the other side of the magnetic sheet, and the via may comprise a first via penetrating through the magnetic sheet and be connected to one end of the first antenna pattern and one end of the wiring pattern.

In this case, the first antenna pattern and the wiring pattern may be formed of a conductive material, the first antenna pattern may be directly bonded to the one side of the magnetic sheet, and the wiring pattern may be directly bonded to the other side of the magnetic sheet.

Further, the first antenna pattern may have a coil shape.

Further, the magnetic sheet may comprise a first via hole vertically penetrating therethrough, and the inner wall of the first via hole may be plated to constitute the first via. Further, the antenna device may further comprise a first terminal pattern disposed on one side of the magnetic sheet; and a second via penetrating through the magnetic sheet, wherein the second via may be connected to the first terminal pattern and the other end of the wiring pattern.

Also, the antenna device may further comprise a second terminal pattern disposed on one side of the magnetic sheet, wherein the second terminal pattern may be connected to the other end of the first antenna pattern, and the first terminal pattern and the second terminal pattern may be disposed to be adjacent to each other.

Further, the antenna device may further comprise a first terminal pattern disposed on the other side of the magnetic sheet, wherein the first terminal pattern may be connected to the other end of the wiring pattern.

Also, the antenna device may further comprise a second terminal pattern disposed on the other side of the magnetic sheet; and a second via penetrating through the magnetic sheet, wherein the second via may be connected to the second terminal pattern and the other end of the first antenna pattern, and the first terminal pattern and the second terminal pattern may be disposed to be adjacent to each other.

In another specific embodiment, the antenna pattern may be composed of a plurality of first conductive line patterns disposed in parallel to be spaced apart from one another on the one side of the magnetic sheet; and a plurality of second conductive line patterns disposed in parallel to be spaced apart from one another on the other side of the magnetic sheet, wherein elongating directions of the first conductive line patterns and the second conductive line patterns may be same, and the via may be composed of a plurality of vias which penetrate through the magnetic sheet and connect the first conductive line patterns and the second conductive line patterns.

In this case, the vias may alternately connect the first conductive line patterns and the second conductive line patterns which are disposed in parallel to be spaced apart from one another, any one end and the other end of the first conductive line patterns may be respectively connected to the two second conductive line patterns adjacent to each other, and any one end and the other end of the second conductive line patterns may be respectively connected to the two first conductive line patterns adjacent to each other.

Further, when the magnetic sheet is divided into a core region and a surrounding region around the core region, both ends of the first conductive line patterns and the second conductive line patterns may be disposed in the surrounding region while the first conductive line patterns and the second conductive line patterns cross the core region, and the vias may be disposed in the surrounding region to connect the ends of the first conductive line patterns and the second conductive line patterns.

Also, the first conductive line patterns, the second conductive line patterns, and the vias may be connected to one another to form a coil surrounding the core region.

According to another embodiment, there is provided a portable terminal comprising a case and an antenna device disposed in the case, wherein the case comprises an electromagnetic wave transmission region and an electromagnetic wave non-transmission region, the antenna device comprises a magnetic sheet; a plurality of first conductive line patterns disposed in parallel to be spaced apart from one another on the one side of the magnetic sheet; a plurality of second conductive line patterns disposed in parallel to be spaced apart from one another on the other side of the magnetic sheet; and a plurality of vias which penetrate through the magnetic sheet, elongating directions of the first conductive line patterns and the second conductive line patterns are same, and the electromagnetic wave transmission region is disposed in parallel with the first conductive line patterns and the second conductive line patterns.

In this embodiment, when the magnetic sheet is divided into a core region and a surrounding region around the core region, both ends of the first conductive line patterns and the second conductive line patterns may be disposed in the surrounding region while the first conductive line patterns and the second conductive line patterns cross the core region, and the vias may be disposed in the surrounding region to connect the ends of the first conductive line patterns and the second conductive line patterns.

In this case, the first conductive line patterns, the second conductive line patterns, and the vias may be connected to one another to form a coil surrounding the core region.

Further, the antenna device may generate an electromagnetic signal in a direction perpendicular to the elongating directions of the first conductive line patterns and the second conductive line patterns, and the electromagnetic signal may go through the electromagnetic wave transmission region to the outside of the case.

Further, the electromagnetic wave transmission region may comprise glass or plastic, and the electromagnetic wave non-transmission region may comprise metal.

In the following description of embodiments, it will be understood that when a layer, foil or sheet is referred to as being "on" or "under" another layer, foil or sheet, the terminology of "on" and "under" includes both the meanings of "directly" and "indirectly". Further, the reference about on and under each element will be made on the basis of drawings. In the drawings, the size or spacing of each element may be exaggerated for better understanding, and the content obvious to those skilled in the art may not be illustrated.

FIG. 1 is a cross-sectional view of a magnetic sheet according to an embodiment.

A magnetic sheet 100 comprises a magnetic powder 110 and a binder resin 120.

That is, the magnetic sheet 100 may be a polymeric magnetic sheet (PMS). Specifically, the magnetic sheet 100 may be an unsintered cured sheet containing the magnetic powder 110 and the binder resin 120. Also, the magnetic sheet 100 may be a flexible magnetic sheet.

The magnetic sheet 100 contains the magnetic powder 110.

The magnetic powder may be an oxide magnetic powder such as ferrite (Ni—Zn-based, Mg—Zn-based, or Mn—Zn-based ferrite); a metallic magnetic powder such as Permalloy, Sendust, an Fe—Si—Cr alloy, and Fe—Si nanocrystals; or a mixed powder thereof. For example, the magnetic powder may be Sendust powder having an Fe—Si—Al alloy composition.

As a specific example, the magnetic powder may have a composition of the following Formula 1.

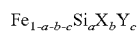

$$Fe_{1-a-b-c}Si_aX_bY_c \qquad \text{[Formula 1]}$$

In Formula 1,

X is aluminum (Al), chromium (Cr), nickel (Ni), copper (Cu), or a combination thereof;

Y is manganese (Mn), boron (B), cobalt (Co), molybdenum (Mo), or a combination thereof; and $0.01 \le a \le 0.2, 0.01 \le b \le 0.1$, and $0 \le c \le 0.05$.

A particle diameter of the magnetic powder is in a range of about 3 nm to about 1 mm. For example, the particle diameter of the magnetic powder may be in a range of about 1 μm to about 300 μm, about 1 μm to about 50 μm, or about 1 μm to about 10 μm. When an average particle diameter of the magnetic powder is within the above preferred range, a sufficient magnetic property may be achieved and a short may be prevented on forming a via in the magnetic sheet.

The magnetic powder may be coated with a functional material. For example, a surface of an individual particle of the magnetic powder may be anti-corrosion coated or insulation coated.

For example, the magnetic powder may be coated with an organic material, and may be particularly coated with a polymer having an anti-corrosion property and/or an insulating property.

Accordingly, the individual particle of the magnetic powder may be composed of a core and a shell surrounding a surface of the core. In this case, the core may contain an oxide magnetic material such as ferrite; a metallic magnetic material such as Permalloy, Sendust, an Fe—Si—Cr alloy, and Fe—Si nanocrystals; or a mixed component thereof. Also, the shell may contain a polymer resin having an anti-corrosion property and/or an insulating property. A thickness of the shell may be in a range of 0.1 μm to 20 μm, or 1 μm to 10 μm.

A curable resin may be used as the binder resin 120. Specifically, the binder resin may comprise a photocurable resin, a thermosetting resin, and/or a high heat-resistant thermoplastic resin, and may preferably comprise the thermosetting resin.

As a resin that may be cured to exhibit adhesiveness, a resin comprising at least one heat-curable function group or moiety such as a glycidyl group, an isocyanate group, a hydroxyl group, a carboxyl group, or an amide group; or at least one active energy-curable function group or moiety, such as an epoxide group, a cyclic ether group, a sulfide group, an acetal group, or a lactone group, may be used. Such a functional group or moiety, for example, may be the isocyanate group (—NCO), the hydroxyl group (—OH), or the carboxyl group (—COOH).

Specifically, examples of the curable resin may be a polyurethane resin, an acrylic resin, a polyester resin, an isocyanate resin, or an epoxy resin which has at least one function group or moiety as described above, but the curable resin is not limited thereto.

According to an embodiment, the binder resin may comprise a polyurethane-based resin, an isocyanate-based hardener, or an epoxy-based resin.

The polyurethane-based resin may comprise repeating units represented by the following Formulae 2a and 2b.

[Formula 2a]
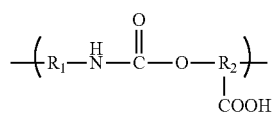

[Formula 2b]
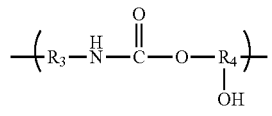

In Formulae 2a and 2b, $R_1$ and $R_3$ are each independently a $C_{1-5}$ alkylene group, an urea group, or an ether group;

$R_2$ and $R_4$ are each independently a $C_{1-5}$ alkylene group; and each of the $C_{1-5}$ alkylene groups is unsubstituted or substituted with at least one substituent selected from the group consisting of halogen, cyano, amino, and nitro.

The polyurethane-based resin may comprise the repeating unit represented by Formula 2a and the repeating unit represented by Formula 2b in a molar ratio of 1:10 to 10:1.

The polyurethane-based resin may have a number-average molecular weight of about 500 g/mol to about 50,000 g/mol, about 10,000 g/mol to about 50,000 g/mol, or about 10,000 g/mol to about 40,000 g/mol, The isocyanate-based hardener may be organic diisocyanate.

For example, the isocyanate-based hardener may be aromatic diisocyanate, aliphatic diisocyanate, alicyclic diisocyanate, or a mixture thereof.

The aromatic diisocyanate, for example, may be diisocyanate having one to two $C_{6-20}$ aryl groups, and may specifically be 1,5-naphthalene diisocyanate, 4,4'-diphenylmethane diisocyanate, 4,4'-diphenyl-dimethylmethane diisocyanate, 4,4'-benzyl isocyanate, dialkyl-diphenylmethane diisocyanate, tetraalkyl-diphenylmethane diisocyanate, 1,3-phenylene diisocyanate, 1,4-phenylene diisocyanate, tolylene diisocyanate, or xylene diisocyanate.

The alicyclic diisocyanate, for example, may be diisocyanate having one to two $C_{6-20}$ cycloalkyl groups, and may specifically be cyclohexane-1,4-diisocyanate, isophorone diisocyanate, dicyclohexylmethane-4,4'-diisocyanate, 1,3-bis(isocyanatemethyl)cyclohexane, or methylcyclohexane diisocyanate.

Preferably, the isocyanate-based hardener may be the alicyclic diisocyanate, and may particularly be isophorone diisocyanate.

Examples of the epoxy-based resin may be a bisphenol-type epoxy resin such as a bisphenol A-type epoxy resin, a bisphenol F-type epoxy resin, a bisphenol S-type epoxy resin, and a tetrabromobisphenol A-type epoxy resin; a spiro ring-type epoxy resin; a naphthalene-type epoxy resin; a biphenyl-type epoxy resin; a terpene-type epoxy resin; a glycidyl ether-type epoxy resin such as tris(glycidyloxyphenyl)methane and tetrakis(glycidyloxyphenyl)ethane; a glycidyl amine-type epoxy resin such as tetraglycidyl diaminodiphenylmethane; a novolac-type epoxy resin such as a cresol novolac-type epoxy resin, a phenol novolac-type epoxy resin, α-naphtol novolac-type epoxy resin, and a brominated phenol novolac-type epoxy resin. These epoxy-based resins may be used alone or in combination of two or more thereof.

Among these resins, the bisphenol A-type epoxy resin, the cresol novolac-type epoxy resin, or the tetrakis(glycidyloxyphenyl)ethane-type epoxy resin may be used in consideration of adhesiveness and heat-resistance.

The epoxy-based resin may have an epoxy equivalent weight of about 80 g/eq to about 1,000 g/eq, or about 100 g/eq to about 300 g/eq. Also, the epoxy-based resin may have a number-average molecular weight of about 10,000 g/mol to 50,000 g/mol.

Furthermore, the magnetic sheet 100 may comprise a corrosion inhibitor. Examples of the corrosion inhibitor may be an organic corrosion inhibitor and an inorganic corrosion inhibitor.

Specific examples of the organic corrosion inhibitor may be amines, urea, mercaptobenzothiazole (MBT), benzotriazole, tolyltriazole, aldehydes, a heterocyclic nitrogen compound, a sulfur-containing compound, an acetylenic compound, ascorbic acid, succinic acid, tryptamine, or caffeine.

For example, the corrosion inhibitor may be N-benzyl-N,N-bis[(3,5-dimethyl-1H-pyrazol-1-yl)methyl]amine, 4-(1-methyl-1-phenylethyl)-N-[4-(1-methyl-1-phenylethyl)phenyl]aniline, tris(benzimidazole-2-ylmethyl)amine, N-(2-furfuryl)-p-toluidine, N-(5-chloro-2-furfuryl)-p-toluidine, N-(5-nitro-2-furfuryl)-p-toluidine, N-(5-methyl-2-furfuryl)-p-toluidine, N-(piperidinomethyl)-3-[(pyridylidene)amino]isatin, tetrakis[ethylene-3-(3,5-di-tert-butyl-4-hydroxyphenyl)propionate]methane, or a mixture thereof.

The magnetic sheet may comprise the magnetic powder in an amount of 50 wt % or more, or 70 wt % or more. For example, the magnetic sheet may comprise the magnetic powder in an amount of 50 wt % to 95 wt %, 70 wt % to 90 wt %, 70 wt % to 90 wt %, 75 wt % to 90 wt %, 75 wt % to 95 wt %, 80 wt % to 95 wt %, or 80 wt % to 90 wt %. Also, in this case, the magnetic powder may have a composition of Formula 1.

Furthermore, the magnetic sheet may comprise the binder resin in an amount of 5 wt % to 40 wt %, 5 wt % to 20 wt %, 5 wt % to 15 wt %, or 7 wt % to 15 wt %.

Also, the magnetic sheet may comprise 6 wt % to 12 wt % of the polyurethane-based resin, 0.5 wt % to 2 wt % of the isocyanate-based hardener, and 0.3 wt % to 1.5 wt % of the epoxy-based resin, as the binder resin, based on the total weight of the magnetic sheet.

Furthermore, the magnetic sheet may comprise the corrosion inhibitor in an amount of 1 wt % to 10 wt %, 1 wt % to 8 wt %, or 3 wt % to 7 wt %.

According to a specific example, the magnetic sheet may comprise 70 wt % to 90 wt % of the magnetic powder, and 6 wt % to 12 wt % of the polyurethane-based resin, 0.5 wt % to 2 wt % of the isocyanate-based hardener, and 0.3 wt % to 1.5 wt % of the epoxy-based resin, as the binder resin, based on the total weight of the magnetic sheet. Also, in this case, the magnetic powder has the composition of Formula 1, the polyurethane-based resin comprises the repeating units represented by Formulae 2a and 2b, the isocyanate-based hardener may be the alicyclic diisocyanate, and the epoxy-based resin may be the bisphenol A-type epoxy resin, the cresol novolac-type epoxy resin, or the tetrakis(glycidyloxyphenyl)ethane-type epoxy resin.

A thickness of the magnetic sheet may be in a range of about 10 µm to about 3,000 µm. For example, the thickness of the magnetic sheet 100 may be in a range of about 10 µm to about 500 µm, about 40 µm to about 500 µm, about 40 µm to about 250 µm, about 50 µm to about 250 µm, about 50 µm to about 200 µm, or about 50 µm to about 100 µm.

The magnetic sheet may have a magnetic permeability of about 100 to about 300 based on an alternating current with a frequency of 3 MHz, a magnetic permeability of about 80 to about 270 based on an alternating current with a frequency of 6.78 MHz, and a magnetic permeability of about 60 to about 250 based on an alternating current with a frequency of 13.56 MHz.

Also, the magnetic sheet may have a magnetic permeability of about 190 to about 250 based on an alternating current with a frequency of 3 MHz, may have a magnetic permeability of about 180 to about 230 based on an alternating current with a frequency of 6.78 MHz, and may have a magnetic permeability of about 140 to about 180 based on an alternating current with a frequency of 13.56 MHz.

Furthermore, the magnetic sheet may have flexibility so as to be used in various devices. For example, the magnetic sheet may not be cut even after 100 times, 1,000 times, or 10,000 times bending in a MIT folding test under conditions of 90 degrees and 35 RPM. Also, a change in magnetic permeability of the magnetic sheet after the 100 times, 1,000 times, or 10,000 times bending in the MIT folding test under conditions of 90 degrees and 35 RPM may be about 10% or less, or about 5% or less.

Furthermore, the magnetic sheet may have a thickness change of about 5% or less and a magnetic permeability change of about 5% or less when subjected to heat-treatment twice, the heat-treatment being composed of heating from 30° C. to 240° C. at a constant rate for 200 seconds and then cooling from 240° C. to 130° C. at a constant rate for 100 seconds. Specifically, when the heat-treatment is repeated twice, the magnetic sheet may have a thickness change of about 3% or less and a magnetic permeability change of about 3% or less, and, more specifically, may have a thickness change of about 1% or less and a magnetic permeability change of about 1% or less.

Also, the magnetic sheet may have chemical-resistance capable of withstanding various environments. For example, the magnetic sheet may have a thickness change of about 5% or less and a magnetic permeability change of about 5% or less when immersed in a 2 N hydrochloric acid solution for 30 minutes, and may have a thickness change of about 5% or less and a magnetic permeability change of about 5% or less when immersed in a 2 N sodium hydroxide solution for 30 minutes. Specifically, the magnetic sheet may have a thickness change of about 3% or less and a magnetic permeability change of about 3% or less when immersed in a 2 N hydrochloric acid solution for 30 minutes, and may have a thickness change of about 3% or less and a magnetic permeability change of about 3% or less when immersed in a 2 N sodium hydroxide solution for 30 minutes. More specifically, the magnetic sheet may have a thickness change of about 1% or less and a magnetic permeability change of about 1% or less when immersed in a 2 N hydrochloric acid solution for 30 minutes, and may have a thickness change of about 1% or less and a magnetic permeability change of about 1% or less when immersed in a 2 N sodium hydroxide solution for 30 minutes.

Furthermore, the magnetic sheet may have corrosion-resistance capable of withstanding various corrosive environments. For example, the magnetic sheet may have a rating number of 9.8 or more in a salt spray test according to KS D 9502. The rating number method is an evaluation method in which a degree of corrosion is indicated by a ratio of corrosion area to effective area, wherein the degree of corrosion is rated on a scale from 0 to 10.

Also, the magnetic sheet may have a weight change of about 10% or less, or about 5% or less when immersed in an about 2 N NaCl solution for 10 minutes. Furthermore, the magnetic sheet may have a magnetic permeability change of about 10% or less, or about 5% or less when immersed in an about 2 N NaCl solution for 10 minutes.

Also, both of the thickness change and the magnetic permeability change of the magnetic sheet may be 10% or less, particularly 5% or less, and more particularly 2% or less when the magnetic sheet is subjected to hot and humid conditions of 85° C. and 85% RH for 72 hours.

Also, the magnetic sheet may have a high breakdown voltage. For example, the magnetic sheet may have a breakdown voltage of 3 kV or more, 3.5 kV or more, or 4 kV or more. Specifically, the magnetic sheet may have a breakdown voltage of 3 kV to 6 kV, 3.5 kV to 5.5 kV, 4 kV to 5 kV, or 4 kV to 4.5 kV.

Furthermore, the magnetic sheet may have excellent insulating properties. For example, the magnetic sheet may have a resistance value of $1\times10^5 \Omega$ or more, $1\times10^7 \Omega$ or more, or $1\times10^9 \Omega$ or more, when a current is applied between two points spaced 500 µm or more apart from each other on the sheet. Preferably, measurement of the resistance value of the magnetic sheet may be impossible or the magnetic sheet may have an infinite resistance value when a current is applied between two points spaced 500 µm or more apart from each other on the sheet.

The magnetic sheet according to the embodiment may be prepared by a method which comprises the steps of mixing a magnetic powder and a binder resin, molding the mixture in a sheet form, and drying the sheet. In this case, the same types and amounts of the magnetic powder and the binder resin as those exemplified above may be used.

Specifically, the magnetic sheet may be prepared by a method which comprises the steps of: (i) dispersing a magnetic powder in a binder resin and a solvent to prepare a slurry; and (ii) molding the slurry in a sheet form and drying the sheet.

According to an embodiment, a method of preparing the magnetic sheet comprises the steps of: (1) mixing a polyurethane-based resin, an isocyanate-based hardener, and an epoxy-based resin to prepare a binder resin; (2) mixing a magnetic powder and an organic solvent with the binder resin to prepare a slurry; and (3) molding the slurry into a sheet form and drying the sheet, wherein the magnetic sheet comprises 6 wt % to 12 wt % of a polyurethane-based resin, 0.5 wt % to 2 wt % of an isocyanate-based hardener, and 0.3 wt % to 1.5 wt % of an epoxy-based resin, as the binder resin, based on the total weight of the magnetic sheet.

As a specific example, a magnetic powder as well as a polyurethane-based resin, an isocyanate-based hardener, and an epoxy-based resin is first added to a solvent, and is dispersed by a dispersing machine (planetary mixer, homo mixer, no-bead mill, etc.) to prepare a slurry having a viscosity of about 100 cPs to about 10,000 cPs. Thereafter, a carrier film is coated with the slurry by a comma coater to be formed as a dry magnetic sheet. The dry magnetic sheet may be prepared into a polymeric magnetic sheet (PMS) by controlling speed and temperature depending on a desired thickness, removing the solvent using a dryer, and winding the molded sheet.

Figure 3:
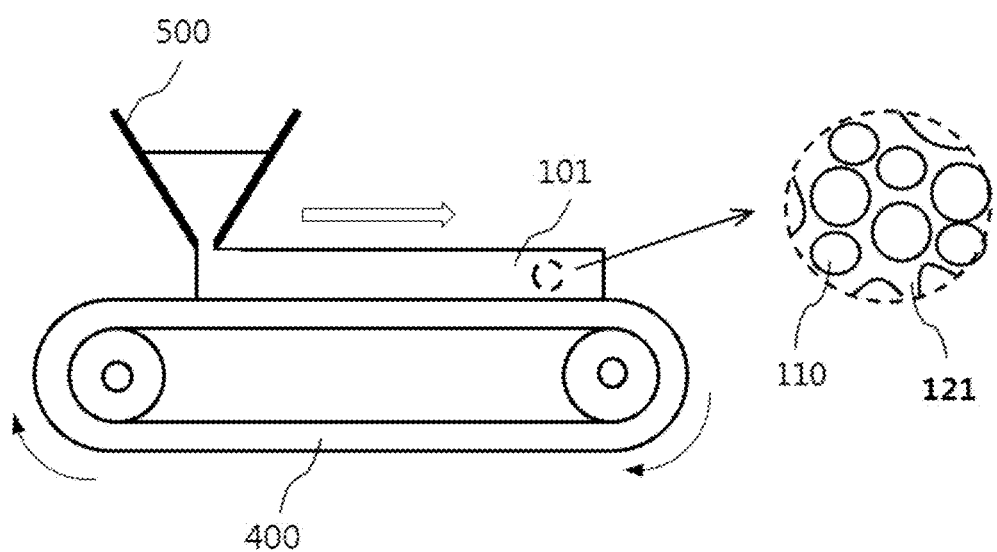
FIG. 3 illustrates a process of preparing a magnetic sheet according to an embodiment.

Referring to FIG. 3, in a case in which a preparation process of a dry magnetic sheet 101 is performed by a roll-to-roll process, a slurry comprising a magnetic powder and a binder resin may be coated on a carrier film 400 by a coater 500 and may then be dried to prepare the dry magnetic sheet 101. In this case, a binder resin 121 in an uncured or semi-cured state may be comprised in the dry magnetic sheet 101.

Thus, the dry magnetic sheet thus prepared may be a magnetic sheet in which curing of the binder resin is not completed.

Also, the magnetic sheet may be cured by hot press after the drying.

That is, the method of preparing the magnetic sheet may further comprise a step of curing the binder resin in the magnetic sheet by hot pressing the magnetic sheet at a pressure of 1 MPa to 100 MPa and a temperature of 100° C. to 300° C., after step (3).

As a result, the magnetic sheet obtained may be a magnetic sheet in which the curing of the binder resin is completed.

A conductive magnetic composite sheet according to an embodiment comprises a magnetic sheet and a conductive foil disposed on at least one side of the magnetic sheet.

Figure 2A:
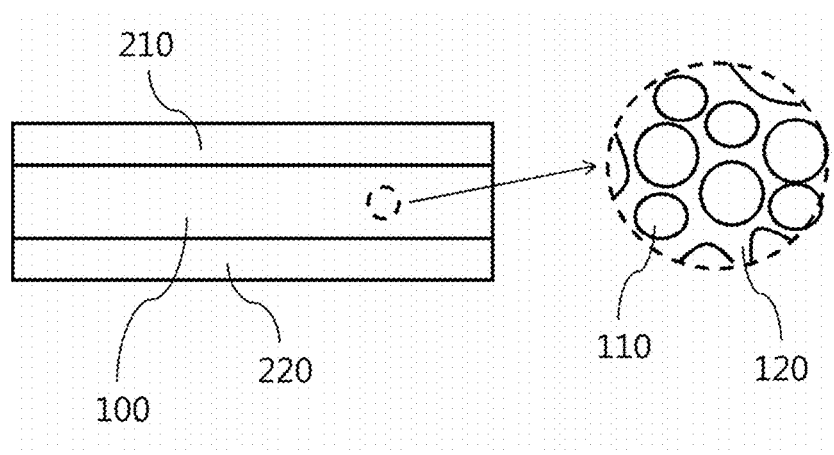
FIGS. 2A and 2B illustrate cross-sectional views of a conductive magnetic composite sheet according to an embodiment.
Figure 2B:
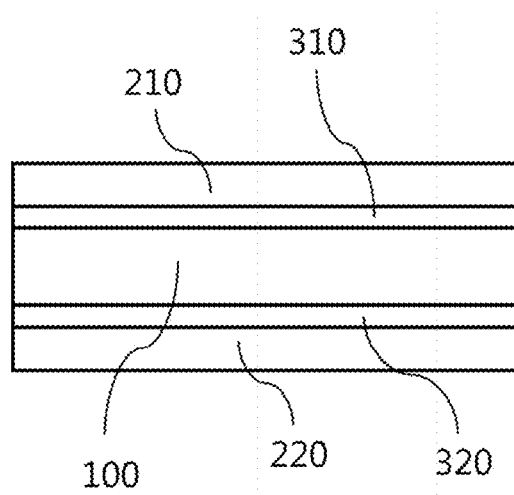

FIGS. 2A and 2B illustrate cross-sectional views of a conductive magnetic composite sheet according to an embodiment. Referring to FIG. 2A, the conductive magnetic composite sheet according to the embodiment has a magnetic sheet 100, a first conductive foil 210, and a second conductive foil 220. Referring to FIG. 2B, the conductive magnetic composite sheet according to the embodiment may further have a first primer layer 310 and a second primer layer 320.

A conductive magnetic composite sheet according to one preferred embodiment comprises a magnetic sheet comprising a magnetic powder and a binder resin; and a first conductive foil which is directly bonded to one side of the magnetic sheet. The conductive magnetic composite sheet may further comprise a second conductive foil which is directly bonded to the other side of the magnetic sheet.

A conductive magnetic composite sheet according to another preferred embodiment comprises a magnetic sheet comprising a magnetic powder and a binder resin; a first conductive foil disposed on one side of the magnetic sheet; and a first primer layer disposed between the magnetic sheet and the first conductive foil to bond them together. The conductive magnetic composite sheet may further comprise a second conductive foil disposed on the other side of the magnetic sheet; and a second primer layer disposed between the magnetic sheet and the second conductive foil to bond them together.

Thus, the conductive magnetic composite sheet is a composite sheet in which the conductive foils and the magnetic sheet are laminated (by the primer layers). For example, the conductive magnetic composite sheet may be a copper foil-laminated magnetic composite sheet.

The magnetic sheet 100 comprised in the conductive magnetic composite sheet may have substantially the same composition and properties as the magnetic sheet according to the embodiment described above, and may also be prepared by substantially the same method.

The magnetic sheet 100 may have a magnetic permeability of 100 to 300 based on an alternating current with a frequency of 3 MHz, a magnetic permeability of 80 to 270 based on an alternating current with a frequency of 6.78 MHz, and a magnetic permeability of 60 to 250 based on an alternating current with a frequency of 13.56 MHz.

According to a specific example, the magnetic sheet may comprise 70 wt % to 90 wt % of a magnetic powder, and 6 wt % to 12 wt % of a polyurethane-based resin, 0.5 wt % to 2 wt % of an isocyanate-based hardener, and 0.3 wt % to 1.5 wt % of an epoxy-based resin, as a binder resin, based on the total weight of the magnetic sheet. Also, in this case, the magnetic powder has the composition of Formula 1, the polyurethane-based resin comprises the repeating units represented by Formulae 2a and 2b, the isocyanate-based hardener may be alicyclic diisocyanate, and the epoxy-based resin may be a bisphenol A-type epoxy resin, a cresol novolac-type epoxy resin, or a tetrakis(glycidyloxyphenyl) ethane-type epoxy resin.

The conductive foil is disposed on at least one side of the magnetic sheet. That is, the conductive foil is disposed on one side and/or the other side of the magnetic sheet.

The conductive foil may comprise a conductive material. For example, the conductive foil may comprise a conductive metal. That is, the conductive foil may be a metal layer. For example, the conductive foil may comprise at least one metal selected from the group consisting of copper, nickel, gold, silver, zinc, and tin. Specifically, the conductive foil may be a metal foil. For example, the conductive foil may be a copper foil.

A thickness of the conductive foil may be in a range of about 6 μm to about 200 μm, for example, about 10 μm to about 150 μm, about 10 μm to about 100 μm, or about 20 μm to about 50 μm.

According to a preferred embodiment, as illustrated in FIG. 2A, the first and second conductive foils 210 and 220 may be directly bonded to the magnetic sheet 100 without a separate adhesive layer. Accordingly, the conductive foil may be directly in contact with a surface of the magnetic sheet. In this case, the conductive foil may be directly bonded to the binder resin of the magnetic sheet. Specifically, the conductive foil may be directly bonded to the thermosetting resin constituting the binder resin.

Also, an adhesive layer may be disposed between the magnetic sheet and the conductive foil. That is, the conductive magnetic composite sheet may further comprise the adhesive layer disposed between the magnetic sheet and the conductive foil, and, in this case, the adhesive layer may be directly in contact with the magnetic sheet and the conductive foil.

Accordingly, the adhesive layer may bond the conductive foil to the magnetic sheet. A thickness of the adhesive layer may be in a range of about 0.1 μm to about 20 μm. Specifically, the thickness of the adhesive layer may be in a range of about 0.1 μm to about 10 μm, about 1 μm to about 7 μm, or about 1 μm to about 5 μm.

The adhesive layer may comprise a thermosetting resin or a high heat-resistant thermoplastic resin. Specifically, the adhesive layer may comprise an epoxy-based resin. The adhesive layer may bond the magnetic sheet to the conductive foil by thermal curing. Thus, the adhesive layer may have high heat-resistance and high adhesion.

For example, the adhesive layer may have high chemical-resistance by comprising the thermosetting resin. Accordingly, the adhesive layer may play a role in protecting the magnetic sheet. That is, when the conductive foil is etched with an etchant, the adhesive layer may protect the magnetic sheet from the etchant.

Thus, since the conductive foil may be directly bonded to the magnetic sheet or may be bonded to the magnetic sheet through the adhesive layer, the conductive foil may be bonded with high adhesive strength. Specifically, since the conductive foil is bonded by curing the thermosetting resin constituting the magnetic sheet or the adhesive layer, the bond strength between the magnetic sheet and the conductive foil may not be reduced even if subjected to a high temperature heat-treatment process.

According to another preferred embodiment, as illustrated in FIG. 2B, the first and second primer layers 310 and 320 are respectively disposed between the magnetic sheet 100 and the first and second conductive foils 210 and 220. That is, the conductive magnetic composite sheet further comprises the first and second primer layers 310 and 320 which are respectively disposed between the magnetic sheet 100 and the first and second conductive foils 210 and 220, and, in this case, the primer layers are directly in contact with the magnetic sheet 100 and the first and second conductive foils 210 and 220.

Accordingly, the primer layer may bond the conductive foil to the magnetic sheet. A thickness of the primer layer may be in a range of about 0.01 µm to about 20 µm. Specifically, the thickness of the primer layer may be in a range of about 0.01 µm to about 10 µm, about 0.01 µm to about 7 µm, about 0.01 µm to about 5 µm, or about 0.01 µm to about 3 µm.

As a specific example, the first primer layer (and second primer layer) may have a thickness of 0.01 µm to 1 µm.

The primer layer may comprise a thermosetting resin or high heat-resistant thermoplastic resin, and may specifically comprise an epoxy-based resin.

As a specific example, the first primer layer (and second primer layer) may comprise a thermosetting resin, and the thermosetting resin in the first primer layer (and second primer layer) may be cured in the step of applying heat and pressure to the stack.

Examples of the epoxy-based resin may be a bisphenol-type epoxy resin such as a bisphenol A-type epoxy resin, a bisphenol F-type epoxy resin, a bisphenol S-type epoxy resin, and a tetrabromobisphenol A-type epoxy resin; a spiro ring-type epoxy resin; a naphthalene-type epoxy resin; a biphenyl-type epoxy resin; a terpene-type epoxy resin; a glycidyl ether-type epoxy resin such as tris(glycidyloxyphenyl)methane and tetrakis(glycidyloxyphenyl)ethane; a glycidyl amine-type epoxy resin such as tetraglycidyl diaminodiphenylmethane; a novolac-type epoxy resin such as a cresol novolac-type epoxy resin, a phenol novolac-type epoxy resin, α-naphtol novolac-type epoxy resin, and a brominated phenol novolac-type epoxy resin. These epoxy-based resins may be used alone or in combination of two or more thereof.

Among these resins, the bisphenol A-type epoxy resin, the cresol novolac-type epoxy resin, or the tetrakis(glycidyloxyphenyl)ethane-type epoxy resin may be used in the first primer layer (and second primer layer) in consideration of adhesiveness and heat-resistance.

The epoxy-based resin may have an epoxy equivalent weight of about 80 g/eq to about 1,000 g/eq, or about 100 g/eq to about 300 g/eq. Also, the epoxy-based resin may have a number-average molecular weight of about 10,000 g/mol to 50,000 g/mol.

As a specific example, the first primer layer (and second primer layer) may have a thickness of 0.01 µm to 1 µm, and may comprise the bisphenol A-type epoxy resin, the cresol novolac-type epoxy resin, or the tetrakis(glycidyloxyphenyl)ethane-type epoxy resin.

The primer layer may bond the magnetic sheet to the conductive foil by thermal curing. Thus, the primer layer may have high heat-resistance and high bond strength.

Also, the primer layer may have high chemical-resistance by comprising the thermosetting resin. Accordingly, the primer layer may play a role in protecting the magnetic sheet. That is, when the conductive foil is etched with an etchant, the primer layer may protect the magnetic sheet from the etchant.

The conductive foil is bonded by curing of the thermosetting resin constituting the magnetic sheet or the primer layer, bond strength between the magnetic sheet and the conductive foil may not be reduced even if the conductive foil is subjected to a high temperature heat-treatment process, such as a reflow or soldering process, which is performed for its application to a product.

Preferably, the conductive magnetic composite sheet has a peel strength between the conductive foil and the magnetic sheet of 0.6 kgf/cm or more, for example, in a range of 0.6 kgf/cm to 20 kgf/cm, in a range of 0.6 kgf/cm to 10 kgf/cm, in a range of 0.6 kgf/cm to 5 kgf/cm, or in a range of 0.6 kgf/cm to 3 kgf/cm.

Also, when the conductive magnetic is subjected to heat-treatment twice, the heat-treatment being composed of heating from 30° C. to 240° C. at a constant rate for 200 seconds and then cooling from 240° C. to 130° C. at a constant rate for 100 seconds, the conductive magnetic composite sheet may have a peel strength between the conductive foil and the magnetic sheet of 0.6 kgf/cm or more, for example, 0.6 kgf/cm to 20 kgf/cm, 0.6 kgf/cm to 10 kgf/cm, 0.6 kgf/cm to 5 kgf/cm, or 0.6 kgf/cm to 3 kgf/cm.

Furthermore, when the heat-treatment is repeated twice under the above conditions, a rate of change (rate of decrease) in peel strength between the conductive foil and the magnetic sheet may be 20% or less, 15% or less, or 10% or less.

Accordingly, with respect to the conductive magnetic composite sheet according to the embodiments, there is little change in physical properties such as a magnetic permeability and a thickness, even if the conductive magnetic composite sheet is subjected to a soldering process such as a reflow process, and a defect such as delamination between the magnetic sheet and the conductive foil, does not occur.

A method of preparing a conductive magnetic composite sheet according to an embodiment comprises the steps of: preparing a magnetic sheet comprising a magnetic powder and a binder resin; stacking the magnetic sheet and the first conductive foil; and applying heat and pressure to the obtained stack to bond the magnetic sheet and the first conductive foil.

In this embodiment, the binder resin may be a thermosetting resin, and the binder resin may bond the magnetic sheet to the first conductive foil while being cured in the step of applying heat and pressure to the stack.

Further, in this embodiment, the first conductive foil may have a first primer layer formed on its one side, and the magnetic sheet and the first conductive foil may be stacked such that one side of the magnetic sheet is in contact with the first primer layer of the first conductive foil.

A method of preparing a conductive magnetic composite sheet according to another embodiment comprises the steps of: preparing a magnetic sheet comprising a magnetic powder and a binder resin; stacking a first conductive foil, the magnetic sheet and a second conductive foil; and applying heat and pressure to the obtained stack to bond the first conductive foil, the magnetic sheet and the second conductive foil together.

In this embodiment, the binder resin may be a thermosetting resin, and the binder resin bonds the first conductive foil, the magnetic sheet and the second conductive foil together while being cured in the step of applying heat and pressure to the stack.

Further, in this embodiment, the first conductive foil has a first primer layer formed on its one side, the second conductive foil has a second primer layer formed on its one side, the magnetic sheet and the first conductive foil are stacked such that one side of the magnetic sheet is in contact with the first primer layer of the first conductive foil, the magnetic sheet and the second conductive foil are stacked such that the other side of the magnetic sheet is in contact with the second primer layer of the second conductive foil.

A method of preparing a conductive magnetic composite sheet according to a preferred embodiment comprises the steps of: preparing a magnetic sheet comprising a magnetic powder and a thermosetting binder resin; stacking the magnetic sheet and the first conductive foil; and applying heat and pressure to the obtained stack to bond the magnetic sheet to the first conductive foil by curing of the binder resin.

A method of preparing a conductive magnetic composite sheet according to another preferred embodiment comprises the steps of: preparing a magnetic sheet comprising a magnetic powder and a binder resin; stacking a first conductive foil, the magnetic sheet and a second conductive foil; and applying heat and pressure to the obtained stack to bond the first conductive foil, the magnetic sheet and the second conductive foil together by curing of the binder resin.

A method of preparing a conductive magnetic composite sheet according to another preferred embodiment comprises the steps of: preparing a magnetic sheet comprising a magnetic powder and a binder resin; forming a first primer layer on one side of a first conductive foil; stacking the magnetic sheet and the first conductive foil such that one side of the magnetic sheet is in contact with the first primer layer of the first conductive foil; and applying heat and pressure to the obtained stack to bond the magnetic sheet to the first conductive foil.

A method of preparing a conductive magnetic composite sheet according to another preferred embodiment comprises the steps of: preparing a magnetic sheet comprising a magnetic powder and a binder resin; forming a first primer layer on one side of a first conductive foil; forming a second primer layer on one side of a second conductive foil; stacking the magnetic sheet and the first conductive foil such that one side of the magnetic sheet is in contact with the first primer layer of the first conductive foil; stacking the magnetic sheet and the second conductive foil such that the other side of the magnetic sheet is in contact with the second primer layer of the second conductive foil; and applying heat and pressure to the obtained stack to bond the first conductive foil, the magnetic sheet, and the second conductive foil together.

The magnetic sheet used in the method may have substantially the same composition and properties as the magnetic sheet according to the embodiments described above, and may also be prepared by substantially the same method.

Specifically, the magnetic sheet may comprise 70 wt % to 90 wt % of a magnetic powder, and 6 wt % to 12 wt % of a polyurethane-based resin, 0.5 wt % to 2 wt % of an isocyanate-based hardener, and 0.3 wt % to 1.5 wt % of an epoxy-based resin, as a binder resin, based on the total weight of the magnetic sheet. As a specific example, the polyurethane-based resin comprises the repeating units represented by Formulae 2a and 2b, the isocyanate-based hardener may be alicyclic diisocyanate, and the epoxy-based resin may be a bisphenol A-type epoxy resin, a cresol novolac-type epoxy resin, or a tetrakis(glycidyloxyphenyl)ethane-type epoxy resin.

The magnetic sheet may be an unsintered sheet with a thickness of 10 μm to 3,000 μm having flexibility.

Also, the magnetic sheet may have a magnetic permeability of 100 to 300 based on an alternating current with a frequency of 3 MHz, a magnetic permeability of 80 to 270 based on an alternating current with a frequency of 6.78 MHz, and a magnetic permeability of 60 to 250 based on an alternating current with a frequency of 13.56 MHz.

Thereafter, a conductive foil is stacked on one side or both sides of the dry magnetic sheet. The conductive foil may be a metal foil and, for example, may be a copper foil.

Figure 4:
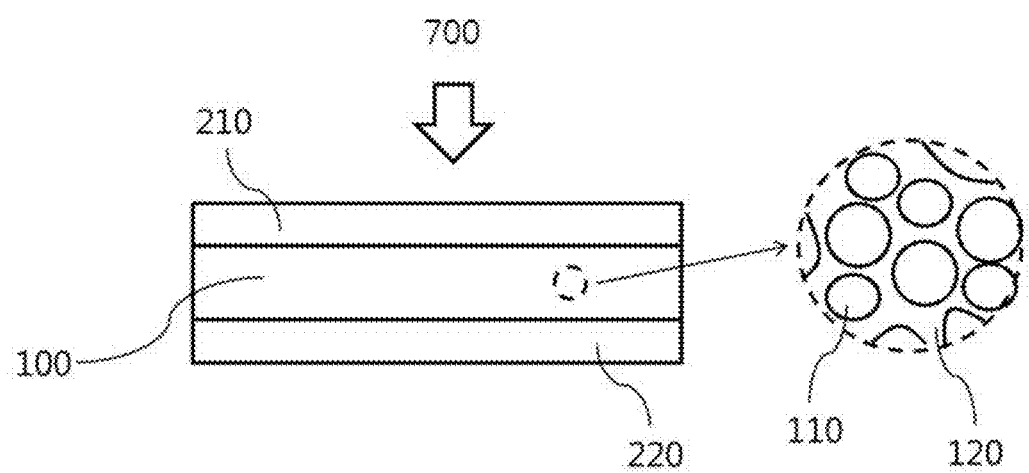
FIG. 4 illustrates a process of preparing a conductive magnetic composite sheet according to an embodiment.

According to a preferred embodiment, as illustrated in FIG. 4, simultaneously with the completion of the curing of the binder resin, the first and second conductive foils 210 and 220 may be bonded to the magnetic sheet 100. Since the first and second conductive foils 210 and 220 are bonded to the magnetic sheet 100 by the thermal curing, the bond strength between the magnetic sheet and the conductive foil may be excellent. In particular, since the magnetic sheet and the conductive foil are bonded together while the binder resin is cured simultaneously with pressing 700, the bond strength may be better. Accordingly, the conductive foil may be easily bonded to the magnetic sheet without a separate adhesive layer.

According to another preferred embodiment, the conductive foil may have a primer layer formed on its one side, and the dry magnetic sheet and the conductive foil are stacked such that the one side of the dry magnetic sheet is in contact with the primer layer of the conductive foil.

The primer layer may comprise a thermosetting resin.

An example of the thermosetting resin used as the first primer layer (and second primer layer) may be an epoxy-based resin.

For example, the first primer layer (and second primer layer) may comprise a bisphenol A-type epoxy resin, a cresol novolac-type epoxy resin, or a tetrakis(glycidyloxyphenyl)ethane-type epoxy resin.

A thickness of the primer layer may be in a range of about 0.01 μm to about 10 μm, about 0.01 μm to about 5 μm, or about 0.01 μm to about 1 μm. Furthermore, the thickness of the primer layer may be in a range of about 0.1 μm to 10 μm, or about 1 μm to 5 μm.

Specifically, the first primer layer (and second primer layer) comprises a thermosetting resin, and the thermosetting resin in the first primer layer (and second primer layer) may be cured in the step of applying heat and pressure to the stack. Also, the binder resin comprises a thermosetting resin, and the thermosetting resin in the binder resin may be cured in the step of applying heat and pressure to the stack.

As a result, simultaneously with the completion of the curing of the magnetic sheet and the primer layer, the first and second conductive foils may be bonded to the magnetic sheet. Since the first and second conductive foils are bonded to the magnetic sheet by the thermally cured first and second primer layers, the bond strength between the magnetic sheet and the conductive foil may be excellent. In particular, since the magnetic sheet and the conductive foil are bonded together while the primer layer is cured simultaneously with pressing, the bond strength may be better.

The step of applying heat and pressure may be performed at a pressure of 1 MPa to 100 MPa and a temperature of 100° C. to 300° C. Also, the step of applying heat and pressure may be performed at a pressure of 5 MPa to 30 MPa and a temperature of 150° C. to 200° C. Furthermore, the process of applying heat and pressure to the magnetic sheet and the conductive foil may be performed for about 0.1 hours to about 5 hours.

The step of applying heat and pressure may be performed by a roll-to-roll process or a batch process.

Figure 5:
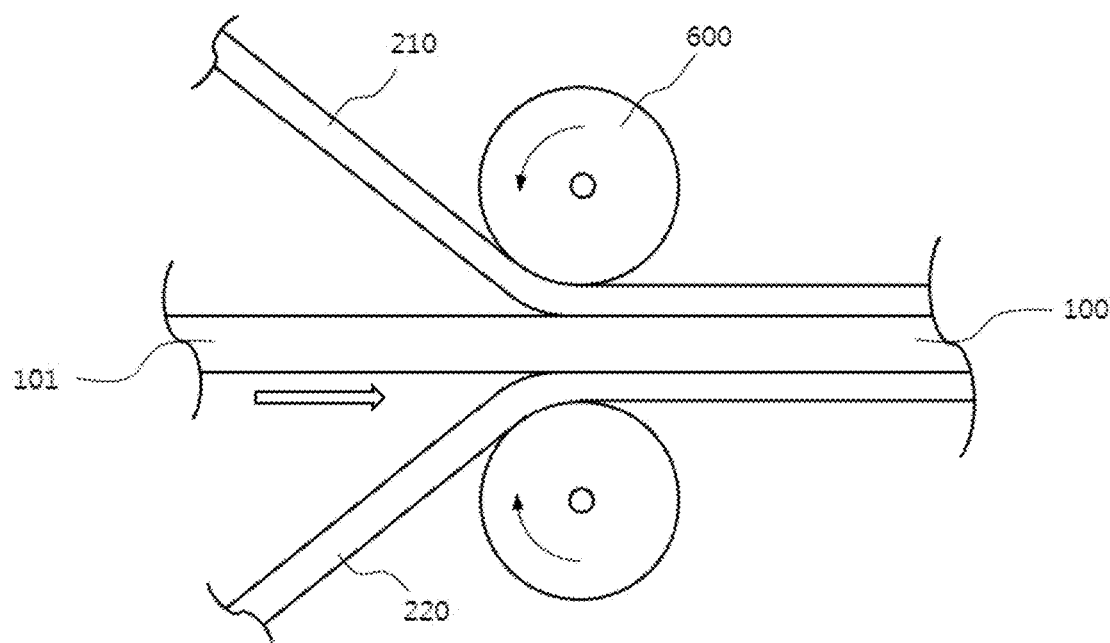
FIGS. 5 and 6 illustrate a roll-to-roll process and a batch process, respectively.

As illustrated in FIG. 5, the step of applying heat and pressure may be performed by a roll-to-roll process. In the roll-to-roll process, the first and second conductive foils 210 and 220 are stacked on one side or both sides of the dry magnetic sheet 101, in which the curing of the binder resin is not completed, and pass through rolls 600. In this case, since the roll itself is heated, the roll may apply both heat and pressure to the stack. That is, the magnetic sheet and the conductive foil are continuously laminated by the rolls. As a result, the magnetic sheet 100, in which the curing of the binder resin is completed, is formed, and, at the same time, the first and second conductive foils 210 and 220 may be bonded to the magnetic sheet 100.

In the roll-to-roll process, a temperature of the roll may be in a range of about 100° C. to about 300° C. Also, a pressure of the roll may be in a range of about 1 MPa to about 100 MPa. Furthermore, about 1 to 20 pairs of the rolls may be used in the roll-to-roll process. In addition, a movement speed of the stack may be in a range of about 0.1 m/min to 10 m/min.

According to a specific example, the stacking step and the step of applying heat and pressure may be performed by a roll-to-roll process, and, in this case, the roll-to-roll process may be performed at a roll temperature of 150° C. to 200° C., a roll pressure of 5 MPa to 30 MPa, and a speed of 1 m/min to 5 m/min by using 2 to 10 pairs of rolls.

Figure 6:
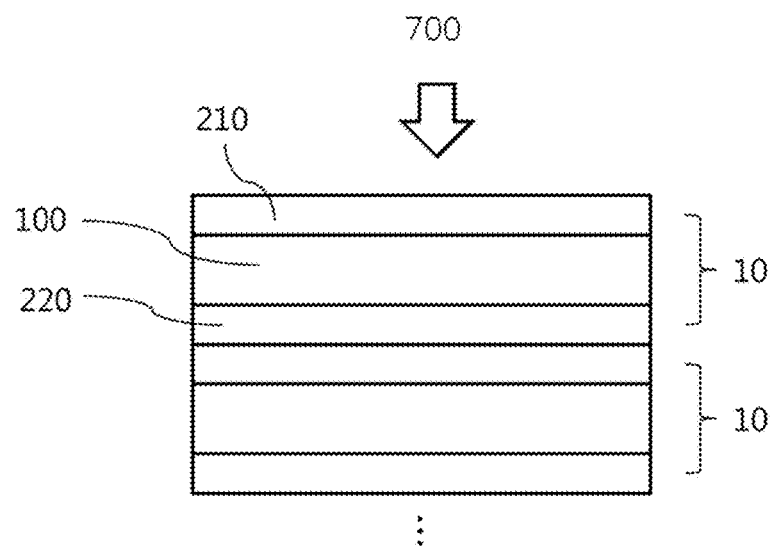

As illustrated in FIG. 6, the step of applying heat and pressure may be performed by a batch process. Specifically, the dry magnetic sheet and the conductive foil are stacked, and the stack thus formed is again stacked in multiple stages. Thereafter, a heat-treatment is performed in a state in which a pressure is applied to the magnetic sheets and conductive foils stacked in multiple stages. As a result, the binder resin of the magnetic sheet and the binder resin are cured, and stacks 10 may be obtained in which the first and second conductive foils 210 and 220 are bonded to the magnetic sheet 100 by the cured binder resin.

In the above batch process, a heat-treatment temperature may be in a range of about 100° C. to about 300° C. Also, the pressure applied to the stacks stacked in multiple stages may be in a range of about 1 MPa to about 100 MPa. Furthermore, a length of time during which the heat and pressure are applied may be in a range of about 0.1 hours to about 5 hours.

Figure 7:
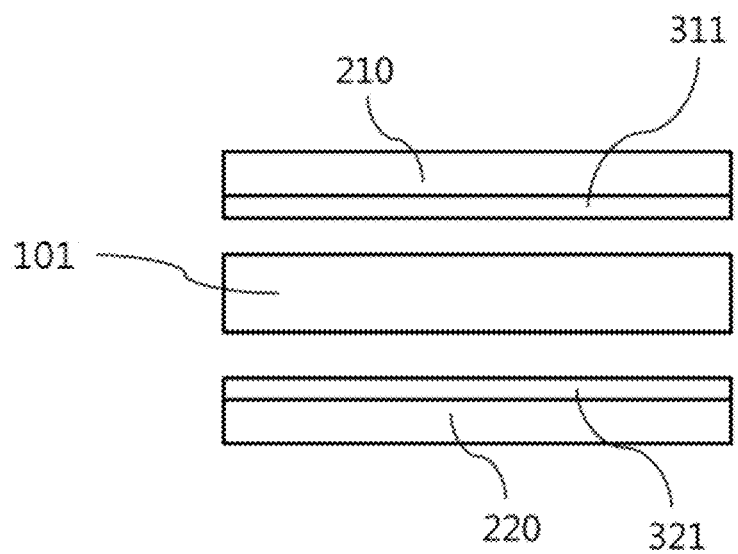
FIGS. 7 and 8 illustrate a process of preparing a conductive magnetic composite sheet according to an embodiment.

According to an embodiment, as illustrated in FIG. 7, an uncured or semi-cured first primer layer 311 is formed on one side of the first conductive foil 210, and an uncured or semi-cured second primer layer 321 is formed on one side of the second conductive foil 220. Thereafter, the first conductive foil 210 and the second conductive foil 220 are respectively stacked to allow the first primer layer 311 and the second primer layer 321 to be respectively in contact with one side and the other side of the dry magnetic sheet 101.

Figure 8:
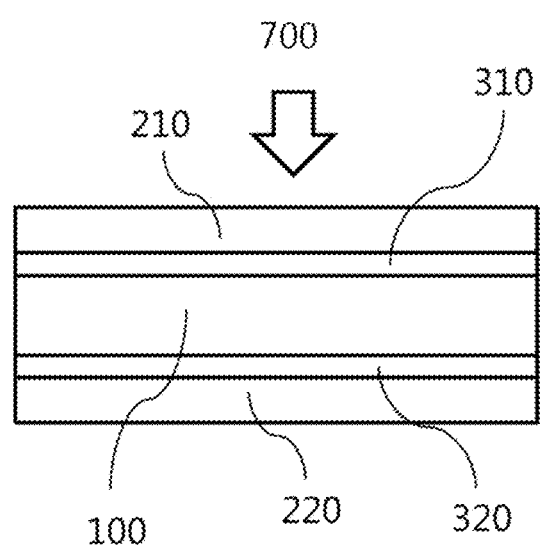

Thereafter, as illustrated in FIG. 8, the dry magnetic sheet, the primer layer, and the conductive foil are laminated by heat and pressure 700. Accordingly, the dry magnetic sheet and the conductive foil may be laminated through the primer layer. In this case, the lamination may be performed under heat and pressure conditions, and, specifically, may be performed by the above-described roll-to-roll process or batch process under the temperature and pressure conditions previously mentioned.

As a result, a magnetic sheet 100 may be formed in which the curing of the binder resin is completed by heat in the lamination process. Also, since the primer layer is cured during the lamination, the magnetic sheet and the conductive foil may be bonded together by the cured primer layer. That is, the cured primer layer may function as an adhesive layer configured to bond the magnetic sheet to the conductive foil. Accordingly, a conductive magnetic composite sheet, in which the magnetic sheet 100 and the first and second conductive foils 210 and 220 are bonded through the cured first and second primer layers 310 and 320, may be obtained.

According to one example, since the first and second primer layers 310 and 320 are formed by curing the thermosetting resin, the first and second primer layers 310 and 320 may have high chemical-resistance. Thus, when the conductive foil is etched with an etchant, the first and second primer layers 310 and 320 may play a role in protecting the magnetic powder comprised in the magnetic sheet.

An antenna device according to an embodiment comprises a magnetic sheet and an antenna pattern disposed on at least one side of the magnetic sheet.

The magnetic sheet comprised in the antenna device may have substantially the same composition and properties as the magnetic sheet according to the embodiment described above, and may also be prepared by substantially the same method.

Accordingly, the magnetic sheet may have a magnetic permeability of 100 to 300 based on an alternating current with a frequency of 3 MHz, a magnetic permeability of 80 to 270 based on an alternating current with a frequency of 6.78 MHz, and a magnetic permeability of 60 to 250 based on an alternating current with a frequency of 13.56 MHz.

The magnetic sheet may comprise a binder resin and magnetic powder dispersed in the binder resin.

Further, the magnetic sheet may be an unsintered cured sheet with a thickness of 10 μm to 3,000 μm having flexibility.

According to a specific example, the magnetic sheet may comprise 70 wt % to 90 wt % of a magnetic powder, and 6 wt % to 12 wt % of a polyurethane-based resin, 0.5 wt % to 2 wt % of an isocyanate-based hardener, and 0.3 wt % to 1.5 wt % of an epoxy-based resin, as the binder resin, based on the total weight of the magnetic sheet. Also, in this case, the magnetic powder has the composition of Formula 1, the polyurethane-based resin comprises the repeating units represented by Formulae 2a and 2b, the isocyanate-based hardener may be alicyclic diisocyanate, and the epoxy-based resin may be a bisphenol A-type epoxy resin, a cresol novolac-type epoxy resin, or a tetrakis(glycidyloxyphenyl)ethane-type epoxy resin.

The antenna pattern is disposed on one side or both sides of the magnetic sheet.

The antenna pattern may comprise a conductive material. For example, the antenna pattern may comprise a conductive metal. Specifically, the antenna pattern may comprise at least one metal selected from the group consisting of copper, nickel, gold, silver, zinc, and tin.

A pattern shape of the antenna pattern according to an embodiment is not particularly limited, and, for example, the pattern may be formed so that a variety of functions comprising those of a near field communication (NFC) antenna, a wireless power charging (WPC) antenna, and a magnetic secure transmission (MST) antenna may be achieved, and the pattern shape may be variously changed if necessary. Also, the antenna pattern may be a printed circuit pattern. The antenna pattern may have a coil shape or a spiral shape.

The antenna pattern may be directly bonded to the magnetic sheet, and, thus, the antenna pattern may be directly in contact with the one side or both sides of the magnetic sheet. Also, the antenna pattern may be firmly bonded to the magnetic sheet by the primer layer.

According to a preferred embodiment, the antenna device comprises a magnetic sheet comprising a magnetic powder and a binder resin; and a first antenna pattern directly bonded to one side of the magnetic sheet.

According to another preferred embodiment, the antenna device comprises a magnetic sheet comprising a magnetic powder and a binder resin; a first antenna pattern directly bonded to one side of the magnetic sheet; and a second antenna pattern directly bonded to the other side of the magnetic sheet.

According to another preferred embodiment, the antenna device comprises a magnetic sheet comprising a magnetic powder and a binder resin; a first antenna pattern disposed on one side of the magnetic sheet; and a first primer layer disposed between the magnetic sheet and the first antenna pattern to bond them together.

According to another preferred embodiment, the antenna device comprises a magnetic sheet comprising a magnetic powder and a binder resin; a first antenna pattern disposed on one side of the magnetic sheet; a second antenna pattern disposed on the other side of the magnetic sheet; a first primer layer disposed between the magnetic sheet and the first antenna pattern to bond them together; and a second primer layer disposed between the magnetic sheet and the second antenna pattern to bond them together.

The antenna device may further comprise a via penetrating through the magnetic sheet.

Thus, the antenna device may comprise magnetic sheet; an antenna pattern disposed on one side or both sides of the magnetic sheet; and at least one via penetrating through the magnetic sheet and connected to the antenna pattern.

The via is in contact with both antenna patterns disposed on both sides of the magnetic sheet to electrically connect the antenna patterns to each other. The via may comprise a conductive material. For example, the via may comprise at least one metal selected from the group consisting of copper, nickel, gold, silver, zinc, and tin.

Furthermore, the magnetic sheet may comprise via holes vertically penetrating therethrough. The via holes, for example, may have a diameter of 100 µm to 300 µm or 120 µm to 170 µm.

In this case, an inner wall of a first via hole is plated, the first via hole is filled with a conductive material, or a solder or conductive bar is inserted into the first via hole, and thus, the first via hole may constitute a first via. For example, the magnetic sheet comprises the first via hole vertically penetrating therethrough, and, in this case, the inner wall of the first via hole may be plated to constitute the first via.

The antenna device according to the embodiment may have various configurations comprising a shape of the antenna pattern, connection of via and terminal, or additional wiring.

According to an embodiment, the antenna pattern comprises a first antenna pattern disposed on the one side of the magnetic sheet, the antenna device further comprises a wiring pattern disposed on the other side of the magnetic sheet, and the via comprises a first via penetrating through the magnetic sheet and connected to one end of the first antenna pattern and one end of the wiring pattern.

According to another embodiment, the antenna pattern is composed of a plurality of first conductive line patterns disposed in parallel to be spaced apart from one another on the one side of the magnetic sheet; and a plurality of second conductive line patterns disposed in parallel to be spaced apart from one another on the other side of the magnetic sheet, wherein elongating directions of the first conductive line patterns and the second conductive line patterns are same, and the via is composed of a plurality of vias which penetrate through the magnetic sheet and connect the first conductive line patterns and the second conductive line patterns.

Hereinafter, specific embodiments of the antenna device will be exemplarily described.

Figure 9:
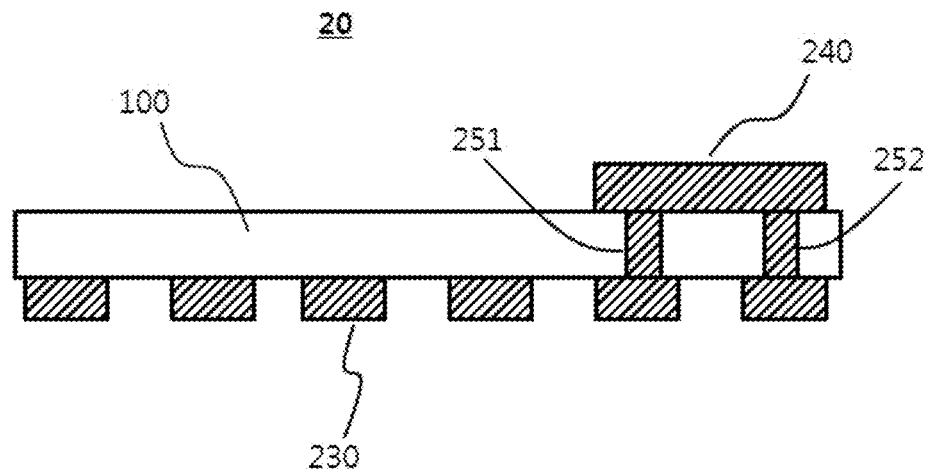
FIG. 9 illustrates a cross-sectional view of an antenna device according to an embodiment.

According to one specific embodiment, referring to FIG. 9, the antenna device comprises a magnetic sheet 100; a first antenna pattern 230 disposed on one side of the magnetic sheet; a wiring pattern 240 disposed on the other side of the magnetic sheet; and the wiring pattern to bond them together; and a first via 251 penetrating through the magnetic sheet 100, and, in this case, the first via 251 is connected to one end of the first antenna pattern 230 and one end of the wiring pattern 240.

The antenna device according to one specific embodiment may further comprise a first terminal pattern and a second terminal pattern on one side or the other side of the magnetic sheet 100, may further comprise a second via 252 penetrating through the magnetic sheet 100, and various antenna devices may be designed according to locations and connection configurations of these components.

Figure 10A:
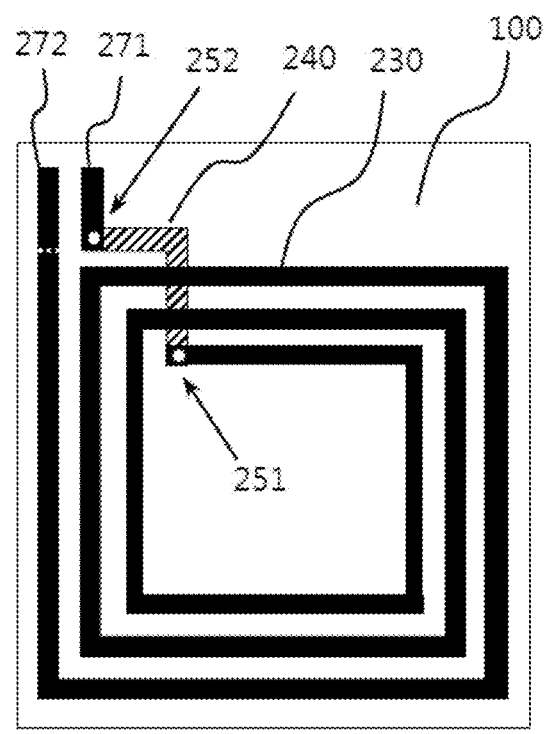
FIGS. 10A to 10C illustrate plan views of an antenna device according to an embodiment (a portion shown in black of a pattern is a front pattern, a hatched portion is a rear pattern, and a portion indicated as a circle is a via).
Figure 10B:
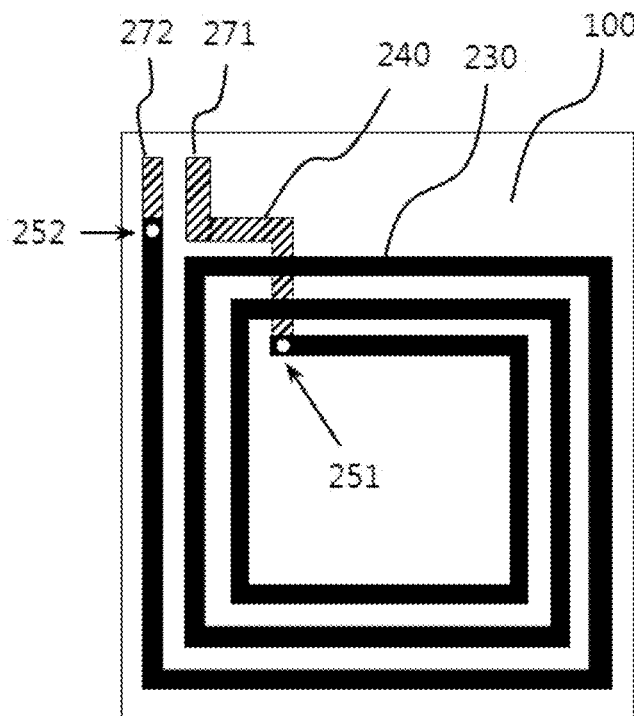
Figure 10C:
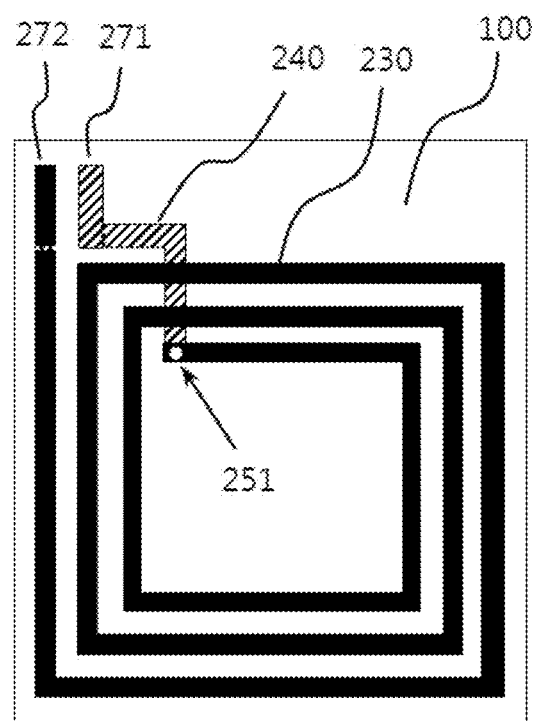

FIGS. 10A to 10C are plan views of the antenna device according to various configuration examples (a portion shown in black of a pattern is a front pattern, a hatched portion is a rear pattern, and a portion indicated as a circle is a via).

Hereinafter, more specific examples of the antenna device according to one specific embodiment will be described with reference to the drawings.

First, referring to FIG. 10A, the antenna device according to one specific embodiment further comprises the first terminal pattern 271 disposed on one side of the magnetic sheet 100; and the second via 252 penetrating through the magnetic sheet 100, and, in this case, the second via 252 may be connected to other ends of the first terminal pattern 271 and the wiring pattern 240. In this case, the antenna device may further comprise the second terminal pattern 272 disposed on one side of the magnetic sheet 100, and, in this case, the other end of the first antenna pattern 230 may be connected to the second terminal pattern 272. Also, in this case, the first terminal pattern 271 and the second terminal pattern 272 may be disposed to be adjacent to each other.

Furthermore, referring to FIG. 10B, the antenna device according to one specific embodiment may further comprise the first terminal pattern 271 disposed on the other side of the magnetic sheet 100, and the first terminal pattern 271 may be connected to the other end of the wiring pattern 240.

In this case, the antenna device may further comprise the second terminal pattern 272 disposed on the other side of the magnetic sheet 100; and the second via 252 penetrating through the magnetic sheet 100, and the second via 252 may be connected to the other ends of the second terminal pattern 272 and the first antenna pattern 230. Also, in this case, the first terminal pattern 271 and the second terminal pattern 272 may be disposed to be adjacent to each other.

Furthermore, referring to FIG. 10C, the antenna device according to one specific embodiment may further comprise the first terminal pattern 271 disposed on the other side of the magnetic sheet 100, and the first terminal pattern 271 may be connected to the other end of the wiring pattern 240. In this case, in another configuration example, the antenna device may further comprise the second terminal pattern 272 disposed on one side of the magnetic sheet 100, and the second terminal pattern 272 may be connected to the other end of the first antenna pattern 230.

In the antenna device according to one specific embodiment, the first antenna pattern and the wiring pattern are formed of a conductive material, the first antenna pattern may be bonded to the one side of the magnetic sheet, and the wiring pattern may be bonded to the other side of the magnetic sheet.

Figure 13:
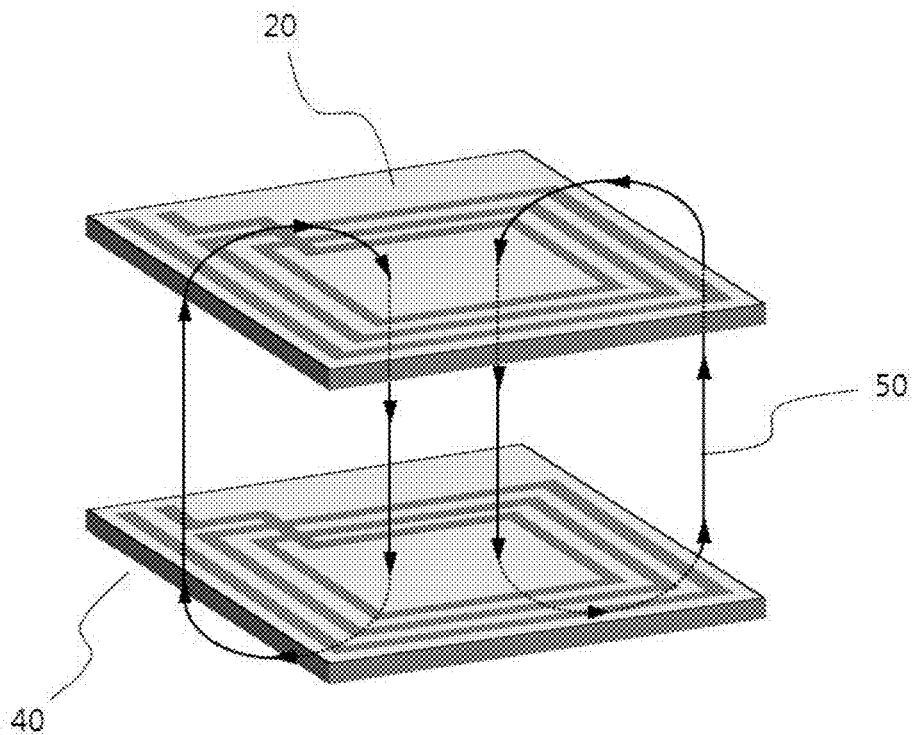
FIGS. 13 and 14 schematically illustrate signal transmission and reception of an antenna device according to an embodiment with an external terminal.

Referring to FIG. 13, the antenna device according to one specific embodiment may generate an electromagnetic signal 50 by a current flowing in the first antenna pattern. The electromagnetic signal 50 enables signal transmission and reception between an antenna device 20 and an external terminal 40.

In the antenna device according to one specific embodiment, since the first antenna pattern and the wiring pattern are respectively disposed on different sides of the magnetic sheet and are connected through the via penetrating through the magnetic sheet, an additional process, such as taping of wiring to prevent a short circuit, is not required, and thus, process efficiency may be increased. Also, since the antenna device according to the embodiment may prevent an increase in thickness due to wiring cloth for insulation, thin film properties of the antenna device may be further improved.

According to another specific embodiment, the antenna device comprises a magnetic sheet; a plurality of first conductive line patterns disposed in parallel to be spaced apart from one another on one side of the magnetic sheet; a plurality of second conductive line patterns disposed in parallel to be spaced apart from one another on the other side of the magnetic sheet; and a plurality of vias disposed to penetrate through the magnetic sheet, and, in this case, elongating directions of the first conductive line patterns and the second conductive line patterns are same, and the vias connect the first conductive line patterns and the second conductive line patterns.

Specifically, since the vias alternately connect the first conductive line patterns and the second conductive line patterns which are disposed in parallel to be spaced apart from one another, any one end and the other end of the first conductive line patterns may be respectively connected to the two second conductive line patterns adjacent to each other, and any one end and the other end of the second conductive line patterns may be respectively connected to the two first conductive line patterns adjacent to each other.

Also, when the magnetic sheet is divided into a core region and a surrounding region around the core region, both ends of the first conductive line patterns and the second conductive line patterns are disposed in the surrounding region while the first conductive line patterns and the second conductive line patterns cross the core region, and the vias are disposed in the surrounding region to be able to connect the ends of the first conductive line patterns and the second conductive line patterns.

In this case, the first conductive line patterns, the second conductive line patterns, and the vias may be connected to one another to form a coil surrounding the core region.

Figure 11A:
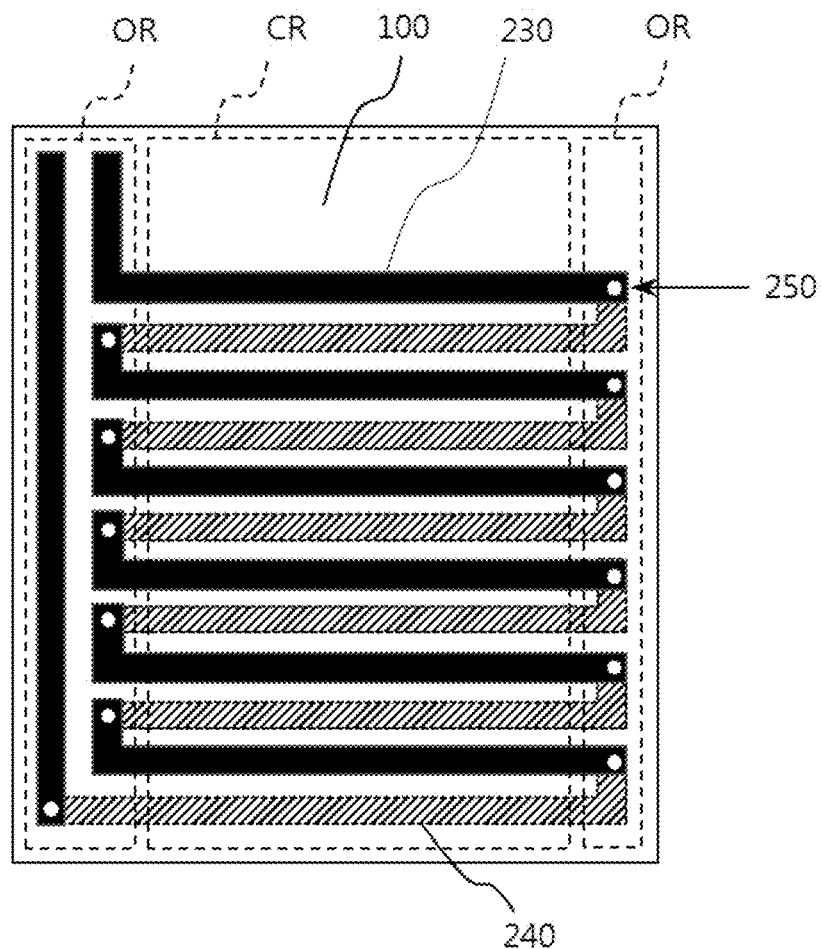
FIGS. 11A and 11B illustrate a plan view and a cross-sectional view of an antenna device according to an embodiment, respectively.
Figure 11B:
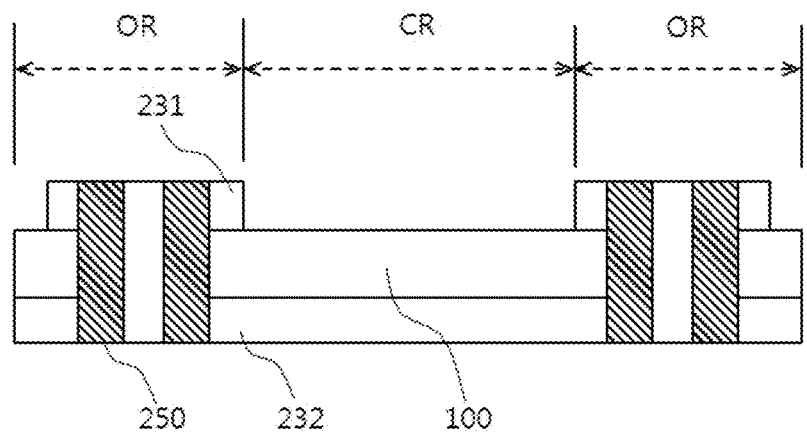

Referring to FIGS. 11A and 11B, the antenna device according to another specific embodiment comprises a magnetic sheet 100, a plurality of first conductive line patterns 231, a plurality of second conductive line patterns 232, and a plurality of vias 250.

The magnetic sheet may be divided into a core region CR and a surrounding region OR adjacent to the core region.

The core region is disposed in a center portion of the magnetic sheet. The core region may have a shape elongating in one direction.

The surrounding region is disposed around the core region. The surrounding region may have a shape elongating in the same direction as the core region. The surrounding region may be disposed on both sides of the core region.

The first conductive line patterns are disposed on the magnetic sheet. Specifically, the first conductive line patterns are bonded to one side of the magnetic sheet.

The first conductive line patterns may extend in a direction crossing the direction in which the core region extends. Specifically, the first conductive line patterns may extend to cross the core region. The first conductive line patterns may extend from the surrounding region disposed on one side of the core region to the surrounding region disposed on the other side of the core region.

The first conductive line patterns may extend side by side. Also, the first conductive line patterns may be spaced apart from one another.

The second conductive line patterns are disposed on the other side of the magnetic sheet. Specifically, the second conductive line patterns are bonded to the other side of the magnetic sheet.

The second conductive line patterns may extend in a direction crossing the direction in which the core region extends. Specifically, the second conductive line patterns may extend to cross the core region. The second conductive line patterns may extend from the surrounding region disposed on one side of the core region to the surrounding region disposed on the other side of the core region.

The second conductive line patterns may extend side by side. Also, the second conductive line patterns may be spaced apart from one another.

The via penetrates through the magnetic sheet. The via connects the first conductive line patterns and the second conductive line patterns. Specifically, the via may be connected to one end of the first conductive line pattern and one end of the second conductive line pattern.

The via may alternately connect the first conductive line patterns and the second conductive line patterns. For example, the first conductive line pattern, the via, the second conductive line pattern, the via, the first conductive line pattern, the via, the second conductive line pattern, and the via may be sequentially connected.

The first conductive line pattern, the second conductive line pattern, and the via may be connected to one another to form a coil spirally surrounding the core region.

Accordingly, when an alternating current flows through the first conductive line pattern, the second conductive line pattern, and the via, an electromagnetic signal may be formed through both ends of the core region.

As a preferred example, the magnetic sheet may be thinly formed and the electromagnetic signal may be formed through the both ends of the core region at high magnetic flux density. Accordingly, the antenna device according to the embodiment may have improved reception sensitivity and may easily transmit and receive the electromagnetic signal even in a narrow gap.

A method of preparing an antenna device according to an embodiment comprises the steps of bonding the magnetic sheet and a conductive foil together by applying heat and pressure thereto; and etching the conductive foil to form an antenna pattern therein.

According to a preferred embodiment, the method of preparing an antenna device comprises the steps of: preparing a magnetic sheet comprising a magnetic powder and a binder resin; stacking the magnetic sheet and a first conductive foil; applying heat and pressure to the obtained stack to bond the magnetic sheet to the first conductive foil; and etching the first conductive foil to form a first antenna pattern therein.

According to another preferred embodiment, the method of preparing an antenna device comprises the steps of: preparing a magnetic sheet comprising a magnetic powder and a binder resin; stacking a first conductive foil, the magnetic sheet and a second conductive foil; and applying heat and pressure to the obtained stack to bond the first conductive foil, the magnetic sheet and the second conductive foil together; and etching the first conductive foil and the second conductive foil to form a first antenna pattern and a second antenna pattern therein, respectively.

According to another preferred embodiment, the method of preparing an antenna device comprises the steps of: preparing a magnetic sheet comprising a magnetic powder and a binder resin; forming a first primer layer on one side of a first conductive foil; stacking the magnetic sheet and the first conductive foil such that one side of the magnetic sheet in contact with the first primer layer of the first conductive foil; applying heat and pressure to the obtained stack to bond the magnetic sheet to the first conductive foil; and etching the first conductive foil to form a first antenna pattern therein.

According to another preferred embodiment, the method of preparing an antenna device comprises the steps of: preparing a magnetic sheet comprising a magnetic powder and a binder resin; forming a first primer layer on one side of a first conductive foil; forming a second primer layer on one side of a second conductive foil; stacking the magnetic sheet and the first conductive foil such that one side of the magnetic sheet is in contact with the first primer layer of the first conductive foil; stacking the magnetic sheet and the second conductive foil such that the other side of the magnetic sheet is in contact with the second primer layer of the second conductive foil; applying heat and pressure to the obtained stack to bond the first conductive foil, the magnetic sheet and the second conductive foil together; and etching the first conductive foil and the second conductive foil to form a first antenna pattern and a second antenna pattern therein, respectively.

The magnetic sheet used in the method may have substantially the same composition and properties as the above-described magnetic sheet according to the embodiment.

As a specific example, the magnetic sheet may comprise 70 wt % to 90 wt % of a magnetic powder, and 6 wt % to 12 wt % of a polyurethane-based resin, 0.5 wt % to 2 wt % of an isocyanate-based hardener, and 0.3 wt % to 1.5 wt % of an epoxy-based resin, as a binder resin, based on the total weight of the magnetic sheet. Also, in this case, the magnetic powder has the composition of Formula 1, the polyurethane-based resin comprises the repeating units represented by Formulae 2a and 2b, the isocyanate-based hardener may be alicyclic diisocyanate, and the epoxy-based resin may be a bisphenol A-type epoxy resin, a cresol novolac-type epoxy resin, or a tetrakis(glycidyloxyphenyl)ethane-type epoxy resin.

Also, the magnetic sheet may be prepared by substantially the same conditions and method as the above-described method of preparing the magnetic sheet according to the embodiments.

Specifically, the magnetic sheet may be prepared by a method comprising the steps of: (a) mixing a polyurethane-based resin, an isocyanate-based hardener, and an epoxy-based resin to prepare a binder resin; (b) mixing a magnetic powder and an organic solvent with the binder resin to prepare a slurry; and (c) molding the slurry into a sheet form and drying the sheet.

A conductive magnetic composite sheet is prepared by the step of applying heat and pressure, and, specific process conditions and method are same as the above-described preparation method of the conductive magnetic composite sheet.

In the etching step, a mask pattern is formed on the conductive foil using a photoresist, and the conductive foil is etched using the mask pattern to be patterned. The etching may be performed by using a typical etchant such as an aqueous acid solution, and, in this case, since the magnetic sheet is protected by the primer layer, there may be little reduction in thickness or magnetic permeability by the etchant. Also, even if the etchant penetrates into the magnetic sheet, there may be little reduction in thickness or magnetic permeability by the etchant due to excellent chemical-resistance of the magnetic sheet.

Preferably, the applying heat and pressure is performed at a pressure of 1 MPa to 100 MPa and a temperature of 100° C. to 300° C., and the etching may be performed by using an aqueous acid solution.

The method of preparing an antenna device may further comprise a process of forming a via configured to penetrate through the magnetic sheet (and the primer layer) between the step of applying heat and pressure and the etching step.

Figure 12A:
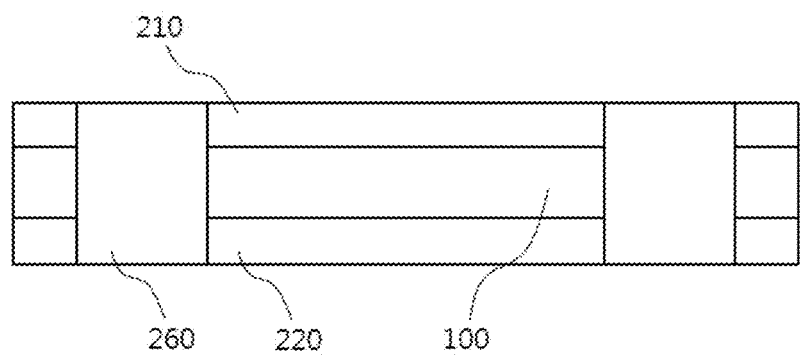
FIGS. 12A to 12C illustrate a process of preparing an antenna device according to an embodiment.
Figure 12B:
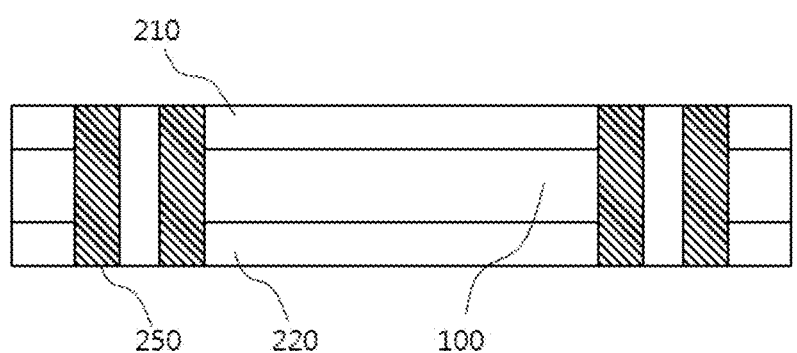
Figure 12C:
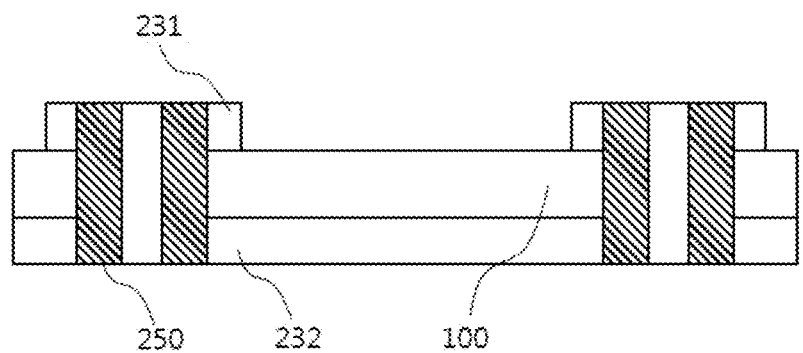

FIGS. 12A to 12C illustrate an example of the method of preparing an antenna device having a via.

First, as illustrated in FIG. 12A, a plurality of via holes 260 is formed on the conductive magnetic composite sheet. The via holes 260 penetrate through the magnetic sheet 100, and the first and second conductive foils 210 and 220. The via hole, for example, may have a diameter of 100 μm to 300 μm, or 120 μm to 170 μm.

Thereafter, as illustrated in FIG. 12B, vias 250 may be formed by forming a plated layer on inside surfaces of the via holes 260. In a case in which the vias are formed by a plating process, the vias formed in a large area may be formed at once. That is, in a case in which the vias are formed as plated layers, the vias may be easily and efficiently formed. Also, vias may be formed by filling conductive powder in the via holes and then sintering the conductive powder. Furthermore, vias may be formed by inserting a solder or conductive bar into the via holes.

Thereafter, a mask pattern is formed by a process such as a photoresist process for covering the first and second conductive foils 210 and 220, and, as illustrated in FIG. 12C, the first conductive foil 210 is selectively etched by the mask pattern to form a first antenna pattern 230.

In this case, the binder resin of the magnetic sheet is closely attached to the antenna pattern. That is, the binder resin of the magnetic sheet is bonded to the antenna pattern by a thermal curing process. Accordingly, in the etching process, the etchant does not penetrate between the magnetic sheet and the antenna pattern. As a result, the antenna pattern may be bonded to the magnetic sheet with improved adhesive strength. Accordingly, a thickness may be reduced and a preparation process may be simplified by directly forming a conductive foil or an antenna pattern on the magnetic sheet without an insulating substrate such as polyimide.

Also, in case that the magnetic sheet and the conductive foil are firmly bonded to each other by thermal curing of the primer layer, the first antenna pattern formed through the etching process may also be bonded to the magnetic sheet with improved adhesive strength. Thus, with respect to the antenna device according to the embodiment, bond strength between the magnetic sheet and the antenna pattern may be improved by the primer layer disposed between the magnetic sheet and the antenna pattern, and the primer layer may protect the magnetic sheet from the external environment.

Also, since the antenna device according to the embodiments has an excellent magnetic property, the antenna device may be used for multiple applications such as NFC, WPC, and MST. Furthermore, since the polymeric magnetic sheet is used, the antenna device according to the embodiments may improve flexibility, and processability may be improved because the antenna device may be prepared by the roll-to-roll process.

In particular, in the magnetic sheet, since the binder resin is cured by heat to be able to hold the magnetic powder more firmly, there may be little changes in weight and thickness even if the environment changes, for example, an etching treatment is performed for patterning, or a reflow or soldering process is performed for the application of the magnetic sheet to a product.

A portable terminal according to an embodiment comprises a case and an antenna device disposed in the case, wherein the case comprises an electromagnetic wave transmission region and an electromagnetic wave non-transmission region, the antenna device comprises a magnetic sheet; a plurality of first conductive line patterns disposed in parallel to be spaced apart from one another on the one side of the magnetic sheet; a plurality of second conductive line patterns disposed in parallel to be spaced apart from one another on the other side of the magnetic sheet; and a plurality of vias which penetrate through the magnetic sheet, elongating directions of the first conductive line patterns and the second conductive line patterns are same, and the electromagnetic wave transmission region is disposed in parallel with the first conductive line patterns and the second conductive line patterns.

Specifically, the magnetic sheet is divided into a core region and a surrounding region around the core region, both ends of the first conductive line patterns and the second conductive line patterns are disposed in the surrounding region while the first conductive line patterns and the second conductive line patterns cross the core region, and the vias are disposed in the surrounding region to connect the ends of the first conductive line patterns and the second conductive line patterns.

Further, the first conductive line patterns, the second conductive line patterns, and the vias are connected to one another to form a coil surrounding the core region.

The antenna device generates an electromagnetic signal in a direction perpendicular to the elongating directions of the first conductive line patterns and the second conductive line patterns, and the electromagnetic signal goes through the electromagnetic wave transmission region to the outside of the case.

For example, the electromagnetic wave transmission region comprises glass or plastic, and the electromagnetic wave non-transmission region comprises metal.

Figure 14:
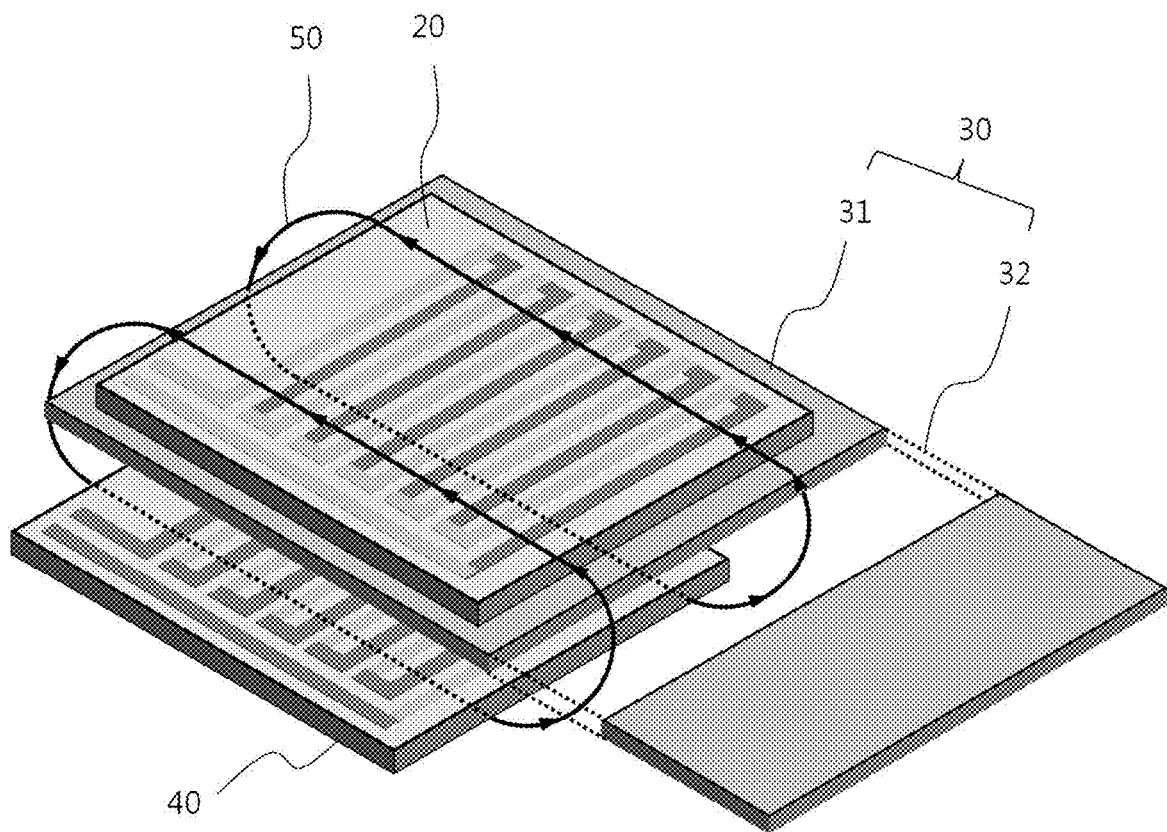

FIG. 14 illustrates a part of a portable terminal in which the antenna device according to an embodiment is used. Referring to FIG. 14, an antenna device 20 is disposed in a case 30. The case 30 comprises an electromagnetic wave transmission region 32 and an electromagnetic wave non-transmission region 31. The electromagnetic wave non-transmission region may comprise a material that blocks an electromagnetic wave, for example, a metal. The electromagnetic wave transmission region may comprise a material through which the electromagnetic wave may easily penetrate, for example, glass or plastic. Even if the transmission region is narrowly formed, the antenna device according to the embodiment may effectively transmit and receive the electromagnetic signal 50 with the external terminal 40.

Since a conventional antenna device is prepared by a method in which an antenna pattern is formed on an insulating substrate layer, such as polyimide, and a magnetic sheet is added thereto, an electromagnetic signal is blocked by the magnetic sheet added to one side of the substrate layer even if conductive line patterns are formed on both sides of the substrate layer and are alternately connected through a via. In contrast, with respect to the antenna device according to the embodiment, since the magnetic sheet is used as the substrate layer to form the conductive line patterns on both sides thereof and the conductive line patterns are alternately connected through the vias to form a coil, the transmission of the electromagnetic signal is not blocked and improved communication sensitivity may be obtained due to an excellent magnetic property of the magnetic sheet.

EXAMPLES

Hereinafter, more specific examples will be exemplarily described.

Materials used in the following examples are as follows:
Sendust powder: CIF-02A, Crystallite Technology
Polyurethane resin: UD1357, Dainichiseika Color & Chemicals Mfg. Co. Ltd.
Isocyanate-based hardener: isophorone diisocyanate, Sigma-Aldrich
Epoxy-based resin: bisphenol A-type epoxy resin (epoxy equivalent weight=189 g/eq), EPIKOTE™ 828, Japan Epoxy Resin Example 1: Preparation of Magnetic Sheet Step 1) Preparation of Magnetic Powder Slurry 42.8 parts by weight of the Sendust powder as a magnetic powder, 15.4 parts by weight of a polyurethane-based resin dispersion (25 wt % of the polyurethane-based resin, 75 wt % of 2-butanone), 1.0 part by weight of an isocyanate-based hardener dispersion (62 wt % of the isocyanate-based hardener, 25 wt % of n-butyl acetate, 13 wt % of 2-butanone), 0.4 part by weight of an epoxy-based resin dispersion (70 wt % of the epoxy-based resin, 3 wt % of n-butyl acetate, 15 wt % of 2-butanone, 13 wt % of toluene), and 40.5 parts by weight of toluene were mixed at a speed of about 40 rpm to about 50 rpm for about 2 hours in a planetary mixer to prepare a magnetic powder slurry.

Step 2) Preparation of Magnetic Sheet

The above-prepared magnetic powder slurry was coated on a carrier film by a comma coater and dried at a temperature of about 110° C. to prepare a dry magnetic sheet. A final magnetic sheet was obtained by compression curing the dry magnetic sheet using a hot press process at a temperature of about 170° C. and a pressure of about 9 MPa for about 30 minutes.

Example 2: Preparation of Copper Foil-Laminated Magnetic Composite Sheet

One side of an about 37 μm thick copper foil was coated with the epoxy-based resin to form an about 4 μm thick primer layer. The copper foil was disposed on both sides of the magnetic sheet obtained in Example 1, and a stack was formed so that the primer layer was disposed between the magnetic sheet and the copper foil. Thereafter, the stack was compressed by a hot press process at a temperature of about 170° C. and a pressure of about 9 MPa for about 60 minutes to cure the primer layer, and thus, a copper foil-laminated magnetic composite sheet was prepared.

Example 3: Preparation of Antenna Device

A plurality of via holes having a diameter of about 0.15 mm was formed in the copper foil-laminated magnetic composite sheet obtained in Example 2 using a drill. Thereafter, a copper plating layer was formed on the inside of the via holes through a copper plating process. The plating layer functioned as a via which connects top and bottom surfaces of the copper foil to each other. Thereafter, a mask pattern was formed on top and bottom surfaces of the copper foil-laminated magnetic composite sheet, and a portion of the copper foil was etched by an etching process. Accordingly, an antenna device having upper patterns and lower patterns was obtained.

The magnetic sheet prepared in Example 1, the copper foil-laminated magnetic composite sheet prepared in Example 2, and the antenna device prepared in Example 3 were tested according to the following procedure.

Experimental Example 1. Magnetic Permeability Measurement

Magnetic permeability and magnetic loss of the magnetic sheet were measured by using an impedance analyzer. The results thereof are summarized in Table 1 below.

TABLE 1

| @ 3 MHz | | @ 6.78 MHz | | @ 13.56 MHz | |
|---|---|---|---|---|---|
| Magnetic permeability | Magnetic loss | Magnetic permeability | Magnetic loss | Magnetic permeability | Magnetic loss |
| 215 | 17.5 | 200 | 50.1 | 160 | 63 |

As illustrated in Table 1, the magnetic sheet according to the embodiments had an excellent magnetic permeability in all three bands.

Experimental Example 2. Heat-Resistance Measurement (Reflow Test)

Figure 15:
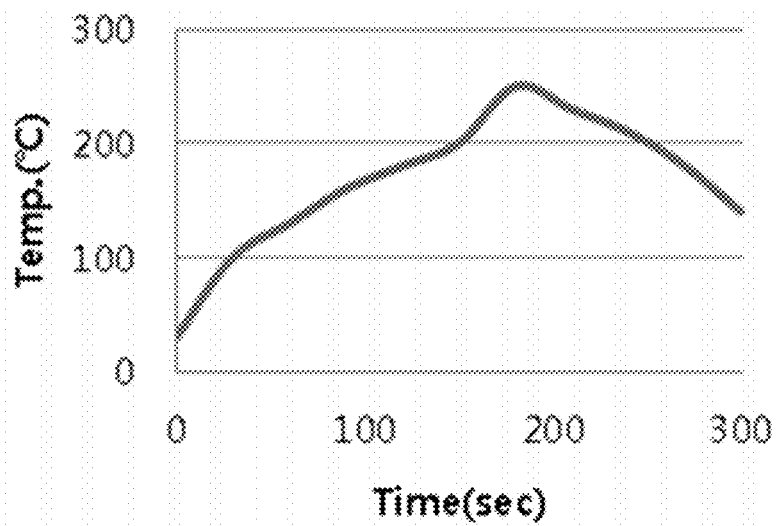
FIG. 15 illustrates a heat-treatment condition in a reflow test.
Figure 16:
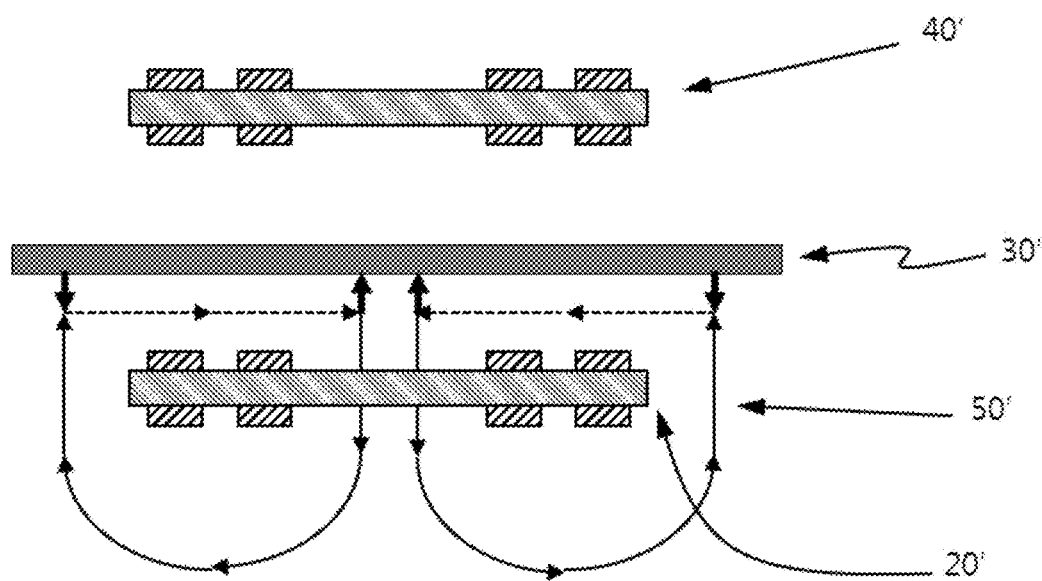
FIG. 16 illustrates signal transmission and reception of a conventional antenna device with an external terminal.

A reflow test was performed twice under a heat-treatment condition in which the magnetic sheet, the copper foil-laminated magnetic composite sheet, and the antenna device were placed in an oven, the temperature of the oven was increased from 30° C. to 240° C. at a constant rate for 200 seconds, and the temperature of the oven was then decreased from 240° C. to 130° C. at a constant rate for 100 seconds (see FIG. 15). Thereafter, changes in thickness, magnetic permeability, and bond strength of each of the magnetic sheet, the copper foil-laminated magnetic composite sheet, and the antenna device were measured.

As a result, blister was not observed on the entire surface of the magnetic sheet even after the reflow test was performed twice. Also, the changes in thickness and magnetic permeability of the magnetic sheet were respectively measured to be less than 5% after the reflow test was performed twice. Furthermore, a peel strength between the magnetic sheet and copper was measured to be 0.6 kgf/cm or more after the reflow test was performed twice.

Experimental Example 3. Heat-Resistance Measurement (Pb Floating Test)

The magnetic sheet and the copper foil-laminated magnetic composite sheet were floated in a molten lead bath and left standing for 40 seconds, and surfaces thereof were then observed. As a result, blister was not observed on the entire surfaces of the magnetic sheet and the copper foil-laminated magnetic composite sheet.

Experimental Example 4. Chemical-Resistance Measurement

The magnetic sheet was immersed in a 2N HCl aqueous solution for about 30 minutes, and changes in mass, thickness, and magnetic permeability of the magnetic sheet were then measured. Also, the magnetic sheet was immersed in a 2N NaOH aqueous solution for about 30 minutes, and changes in mass, thickness, and magnetic permeability of the magnetic sheet were then measured. As a result, precipitation of the magnetic powder did not occur at the bottom of the solution, and the changes in mass, thickness, and magnetic permeability of the magnetic sheet were respectively measured to be 5% or less.

Experimental Example 5. Rust-Resistance Measurement

A neutral NaCl brine having a concentration of 5% was sprayed on the magnetic sheet at an average rate of 1 mL/hour to 2 mL/hour for 72 hours at 35° C. according to a salt spray test based on KS D9502, and occurrence of rust was then observed. As a result of measuring the occurrence of rust by an area method (rating number method), a rating number of 9.8 or more was measured (the rating number method is an evaluation method in which a degree of corrosion is indicated by a ratio of corrosion area to effective area, wherein the degree of corrosion is rated on a scale from 0 to 10).

Experimental Example 6. Peel Strength Measurement

Peel strength between the magnetic sheet and the copper foil of the copper foil-laminated magnetic composite sheet was measured using a universal testing machine (UTM). As a result, a peel strength of 0.6 kgf/cm or more was measured.

Experimental Example 7. Bond Strength Measurement (Cross-Cut Test)

Bond strength between the magnetic sheet and the copper foil of the copper foil-laminated magnetic composite sheet was measured by a cross-cut test (ASTM D3369). As a result of the cross-cut test, a bond strength of 0/100 to 5/100 was measured.

Experimental Example 8. High Temperature- and High Humidity-Resistance Measurement The magnetic sheet was left standing in a constant temperature and humidity oven at 85° C./85% RH for 72 hours, and changes in thickness and magnetic permeability of the magnetic sheet were then measured. As a result, the changes in thickness and magnetic permeability of the magnetic sheet were respectively measured to be 5% or less.

Example 4: Preparation of Magnetic Sheet

A magnetic sheet was prepared by repeating the procedures of steps (1) and (2) of Example 1, but by using organically coated Sendust powder as the magnetic powder in step (1).

Experimental Example 9. Breakdown Voltage Measurement

Electrodes were installed on both sides of each of the magnetic sheets obtained in Examples 1 and 4, and a breakdown voltage was measured by applying a voltage while gradually increasing the voltage.

As a result, the magnetic sheet obtained in Example 1 had a breakdown voltage of 4 kV, and the magnetic sheet obtained in Example 4 had a breakdown voltage of 4.3 kV.

Experimental Example 10. Insulating Property Measurement

A copper foil-laminated magnetic composite sheet was prepared in the same manner as in Example 2 by using the magnetic sheet obtained in Example 4. Thereafter, two via holes having a diameter of 400 μm were formed in the copper foil-laminated magnetic composite sheet and copper plating was performed on the inside of the via holes in the same manner as in Example 3. Also, an upper pattern and a lower pattern were formed by etching the copper foil in the same manner as in Example 3, but the two via holes were not allowed to be connected with the pattern. Thereafter, while flowing a current through the two via holes, resistance between the two via holes was measured.

In this case, the resistance was measured while variously changing a spacing between the two via holes to 500 μm, 700 μm, 900 μm, 1,100 μm, 1,400 μm, 2,400 μm, 4,400 μm, 6,400 μm, and 8,400 μm.

Furthermore, the resistance was measured after a polyimide layer and an adhesive layer were further inserted between the copper foil and the magnetic sheet to prepare a composite sheet and two via holes at various spacings were formed in the above-described manner.

As a result, the magnetic sheet of the embodiments had an infinite resistance value for all spacings between the via holes and configurations of the composite sheet.

The invention claimed is:

1. An antenna device comprising:
  a magnetic sheet;
  an antenna pattern disposed on one side or both sides of the magnetic sheet; and
  at least one via penetrating through the magnetic sheet and connected to the antenna pattern,
  wherein (a) the magnetic sheet is an unsintered cured sheet with a thickness of 10 μm to 500 μm having flexibility, and the magnetic sheet comprises a binder resin and a magnetic powder dispersed in the binder resin;
  (b) the magnetic sheet has a magnetic permeability of 100 to 300 based on an alternating current with a frequency of 3 MHz, a magnetic permeability of 80 to 270 based on an alternating alternating current with a frequency of 13.56 MHz;
  (c) the magnetic sheet has a thickness change of about 5% or less and a magnetic permeability change of about 5% or less when subjected to heat-treatment twice, the heat-treatment being composed of heating from 30° C. to 240° C. at a constant rate for 200 seconds and then cooling from 240° C. to 130° C. at a constant rate for 100 seconds; and
  (d) the magnetic sheet has a thickness change of about 5% or less and a magnetic permeability change of about 5% or less when immersed in a 2 N hydrochloric acid solution for 30 minutes, and has a thickness change of about 5% or less and a magnetic permeability change of about 5% or less when immersed in a 2 N sodium hydroxide solution for 30 minutes, respectively.

2. The antenna device of claim 1, wherein the antenna pattern comprises a first antenna pattern disposed on the one side of the magnetic sheet, the antenna device further comprises a wiring pattern disposed on the other side of the magnetic sheet, and the via comprises a first via penetrating through the magnetic sheet and connected to one end of the first antenna pattern and one end of the wiring pattern.

3. The antenna device of claim 2, wherein the first antenna pattern and the wiring pattern are formed of a conductive material, the first antenna pattern is directly bonded to the one side of the magnetic sheet, and the wiring pattern is directly bonded to the other side of the magnetic sheet.

4. The antenna device of claim 2, wherein the first antenna pattern has a coil shape.

5. The antenna device of claim 2, wherein the magnetic sheet comprises a first via hole vertically penetrating therethrough, and the inner wall of the first via hole is plated to constitute the first via.

6. The antenna device of claim 2, further comprising a first terminal pattern disposed on one side of the magnetic sheet; and a second via penetrating through the magnetic sheet, wherein the second via is connected to the first terminal pattern and the other end of the wiring pattern.

7. The antenna device of claim 6, further comprising a second terminal pattern disposed on one side of the magnetic sheet, wherein the second terminal pattern is connected to the other end of the first antenna pattern, and the first terminal pattern and the second terminal pattern are disposed to be adjacent to each other.

8. The antenna device of claim 2, further comprising a first terminal pattern disposed on the other side of the magnetic sheet, wherein the first terminal pattern is connected to the other end of the wiring pattern.

9. The antenna device of claim 8, further comprising a second terminal pattern disposed on the other side of the magnetic sheet; and a second via penetrating through the magnetic sheet, wherein the second via is connected to the second terminal pattern and the other end of the first antenna pattern, and the first terminal pattern and the second terminal pattern are disposed to be adjacent to each other.

10. The antenna device of claim 1, wherein the antenna pattern is composed of a plurality of first conductive line patterns disposed in parallel to be spaced apart from one another on the one side of the magnetic sheet; and a plurality of second conductive line patterns disposed in parallel to be spaced apart from one another on the other side of the magnetic sheet, wherein elongating directions of the first conductive line patterns and the second conductive line patterns are same, and the via is composed of a plurality of vias which penetrate through the magnetic sheet and connect the first conductive line patterns and the second conductive line patterns.

11. The antenna device of claim 10, wherein the vias alternately connect the first conductive line patterns and the second conductive line patterns which are disposed in parallel to be spaced apart from one another, any one end and the other end of the first conductive line patterns are respectively connected to the two second conductive line patterns adjacent to each other, and any one end and the other end of the second conductive line patterns are respectively connected to the two first conductive line patterns adjacent to each other.

12. The antenna device of claim 10, wherein, when the magnetic sheet is divided into a core region and a surrounding region around the core region, both ends of the first conductive line patterns and the second conductive line patterns are disposed in the surrounding region while the first conductive line patterns and the second conductive line patterns cross the core region, and the vias are disposed in the surrounding region to connect the ends of the first conductive line patterns and the second conductive line patterns.

13. The antenna device of claim 12, wherein the first conductive line patterns, the second conductive line patterns, and the vias are connected to one another to form a coil surrounding the core region.

14. A portable terminal comprising a case and an antenna device disposed in the case, wherein the case comprises an electromagnetic wave transmission region and an electromagnetic wave non-transmission region, the antenna device comprises a magnetic sheet; a plurality of first conductive line patterns disposed in parallel to be spaced apart from one another on the one side of the magnetic sheet; a plurality of second conductive line patterns disposed in parallel to be spaced apart from one another on the other side of the magnetic sheet; and a plurality of vias which penetrate through the magnetic sheet, elongating directions of the first conductive line patterns and the second conductive line patterns are same, and the electromagnetic wave transmission region is disposed in parallel with the first conductive line patterns and the second conductive line patterns, wherein (a) the magnetic sheet is an unsintered cured sheet with a thickness of 10 µm to 500 µm having flexibility, and the magnetic sheet comprises a binder resin and a magnetic powder dispersed in the binder resin;

(b) the magnetic sheet has a magnetic permeability of 100 to 300 based on an alternating current with a frequency of 3 MHz, a magnetic permeability of 80 to 270 based on an alternating current with a frequency of 6.78 MHz, and a magnetic permeability of 60 to 250 based on an alternating current with a frequency of 13.56 MHz;

(c) the magnetic sheet has a thickness change of about 5% or less and a magnetic permeability change of about 5% or less when subjected to heat-treatment twice, the heat-treatment being composed of heating from 30° C. to 240° C. at a constant rate for 200 seconds and then cooling from 240 C. to 130° C. at a constant rate for 100 seconds; and (d) the magnetic sheet has a thickness change of about 5% or less and a magnetic permeability change of about 5% or less when immersed in a 2 N hydrochloric acid solution for 30 minutes, and has a thickness change of about 5% or less and a magnetic permeability change of about 5% or less when immersed in a 2 N sodium hydroxide solution for 30 minutes, respectively.

15. The portable terminal of claim 14, wherein, when the magnetic sheet is divided into a core region and a surrounding region around the core region, both ends of the first conductive line patterns and the second conductive line patterns are disposed in the surrounding region while the first conductive line patterns and the second conductive line patterns cross the core region, and the vias are disposed in the surrounding region to connect the ends of the first conductive line patterns and the second conductive line patterns.

16. The portable terminal of claim 15, wherein the first conductive line patterns, the second conductive line patterns, and the vias are connected to one another to form a coil surrounding the core region.

17. The portable terminal of claim 14, wherein the antenna device generates an electromagnetic signal in a direction perpendicular to the elongating directions of the first conductive line patterns and the second conductive line patterns, and the electromagnetic signal goes through the electromagnetic wave transmission region to the outside of the case.

18. The portable terminal of claim 14, wherein the electromagnetic wave transmission region comprises glass or plastic, and the electromagnetic wave non-transmission region comprises metal.

* * * * *